(12) United States Patent
Suri

(10) Patent No.: US 8,855,012 B1
(45) Date of Patent: Oct. 7, 2014

(54) MOBILE, SECURE AND CUSTOMIZABLE EMERGENCY SERVICE GATEWAY SYSTEM

(75) Inventor: Neetu S. Suri, San Jose, CA (US)

(73) Assignee: Mojyle LLC, San Jose, CA (US)

( * ) Notice: Subject to any disclaimer, the term of this patent is extended or adjusted under 35 U.S.C. 154(b) by 188 days.

(21) Appl. No.: 13/422,841

(22) Filed: Mar. 16, 2012

Related U.S. Application Data

(60) Provisional application No. 61/454,120, filed on Mar. 18, 2011.

(51) Int. Cl.
*H04L 12/28* (2006.01)
*H04L 1/00* (2006.01)

(52) U.S. Cl.
USPC .......................................... 370/254; 370/401

(58) Field of Classification Search
CPC combination set(s) only.
See application file for complete search history.

(56) References Cited

U.S. PATENT DOCUMENTS

| | | | | |
|---|---|---|---|---|
| 7,072,657 | B2 * | 7/2006 | Watanabe et al. | 455/439 |
| 7,590,074 | B1 * | 9/2009 | Dondeti et al. | 370/254 |
| 8,072,973 | B1 * | 12/2011 | Kotha et al. | 370/389 |
| 2006/0203719 | A1 * | 9/2006 | Kim et al. | 370/227 |
| 2006/0282889 | A1 * | 12/2006 | Brown et al. | 726/15 |
| 2008/0046995 | A1 * | 2/2008 | Satterlee et al. | 726/15 |
| 2008/0232384 | A1 * | 9/2008 | Miyabe | 370/401 |
| 2009/0235351 | A1 * | 9/2009 | Brown et al. | 726/15 |
| 2009/0313368 | A1 * | 12/2009 | Hollebeek et al. | 709/223 |
| 2010/0008253 | A1 * | 1/2010 | Mellachervu et al. | 370/254 |
| 2010/0325719 | A1 * | 12/2010 | Etchegoyen | 726/15 |
| 2012/0227102 | A1 * | 9/2012 | Parla et al. | 726/15 |

OTHER PUBLICATIONS

"3G/WiFi Seamless Offload", Web page, Mar. 31, 2010, Downloaded & Printed Apr. 3, 2012, www.qualcomm.com/media/documents/3gwifi-seamless-offload.

"AMG2100 Mobile Gateway", Web page, 2009, Downloaded & Printed Apr. 3, 2012, mrc.vislink.com/products/products/?Product=108.

"Truffle", Web page / brochure, 2011, Downloaded & Printed Apr. 3, 2012, www.mushroomnetworks.com/get_file.aspx?id=90A9E6E9-B3B8-4202-958D-70C1FE4A74FD&name=brochure%20Truffle.pdf.

"Mobile Intelligent Services", Web page / brochure, Downloaded & Printed Apr. 3, 2012, www.pterex.com/docs/pTerex%207-Series%20Datasheet%20v24.pdf.

"Truffle", Web page, Downloaded & Printed Mar. 13, 2012, www.mushroomnetworks.com/products.aspx?product_id=1000.

"Livestream Livepack", Web page, Downloaded & Printed Mar. 13, 2012, www.livestream.com/platform/livepack.

"PacStar 4000-Series", Web page, Downloaded & Printed Mar. 13, 2012, www.pacstar.com/pgs/products/deployable-communications/pacstar-4000-series/.

"PacStar 4500 Commander Kit (CK) with ESR", Web page/brochure, Downloaded & Printed Apr. 3, 2012, www.pacstar.com/wp-content/uploads/2012/02/PacStar_4500_ESR_Datasheet_082311.pdf.

* cited by examiner

*Primary Examiner* — Clemence Han
(74) *Attorney, Agent, or Firm* — Michael S. Neustel

(57) ABSTRACT

A mobile, secure and customizable emergency communication gateway system for providing effective electronic data communications for emergency personnel in a mobile environment. The mobile, secure and customizable emergency communication gateway system generally includes a mobile communication unit, a plurality of remote devices in communication with the mobile communication unit, a central communication unit, and a plurality of telecommunication networks. The mobile communication unit creates a plurality of virtual private networks (VPN) over the telecommunication networks tunneled to the central communication unit. The plurality of VPNs ensure that at least one VPN is available at all times for the mobile communication unit to communicate with the central communication unit. Load balancing, bundling and link bonding of communications may also be achieved over the plurality of VPNs.

17 Claims, 17 Drawing Sheets

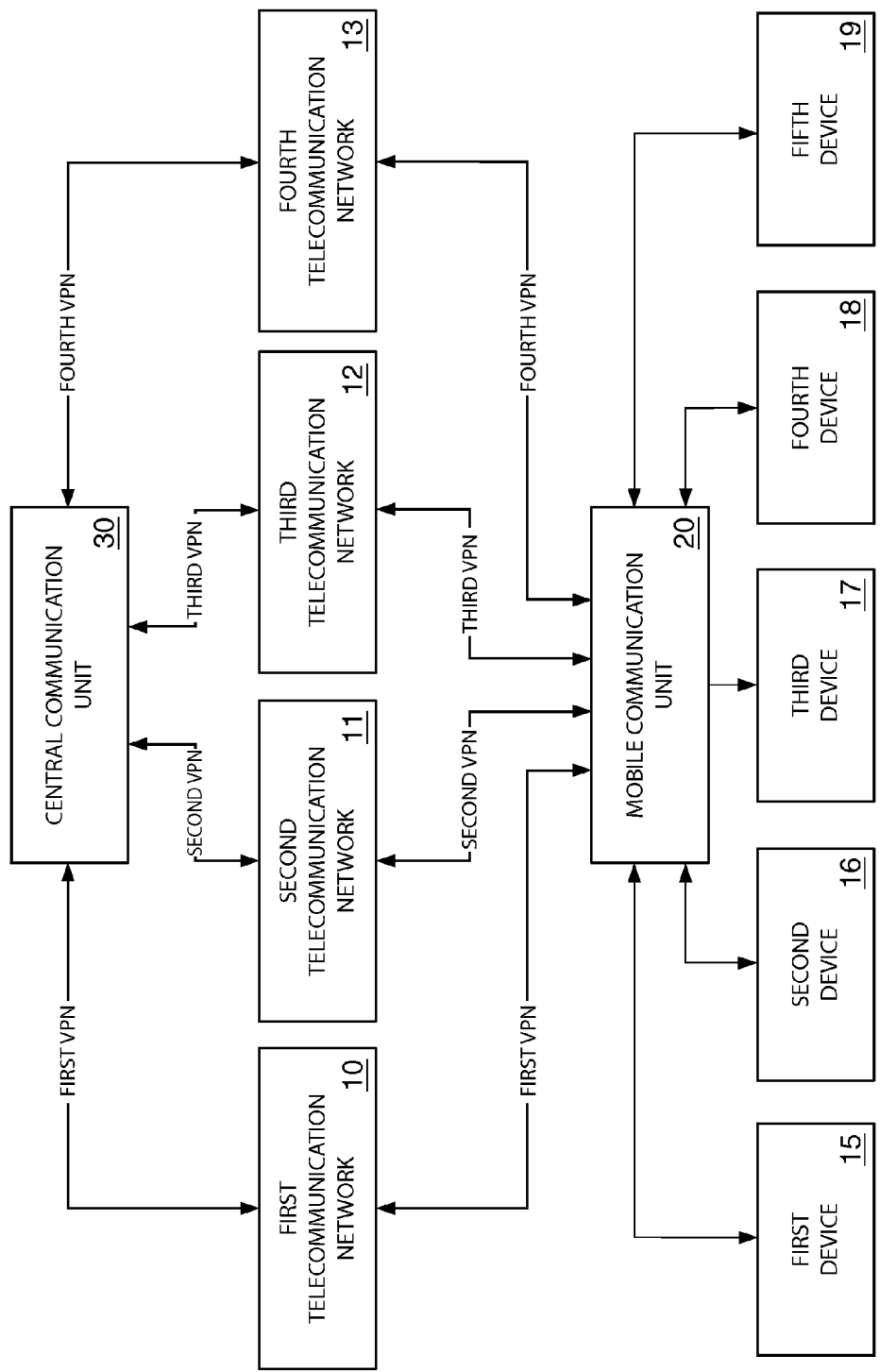

FIG. 2c

| GSM Tech | Score |
|---|---|
| GPRS | 5 |
| EDGE | 10 |
| UMTS | 15 |
| HSDPA | 20 |
| HSUPA | 25 |
| HSPA | 50 |

| CDMA RSSI | Score |
|---|---|
| <=-125 | 5 |
| -124 to -108 | 10 |
| -107 to -99 | 15 |
| -98 to -89 | 20 |
| -88 to -77 | 25 |
| >=-76 | 30 |

| CDMA Tech | Score |
|---|---|
| 1xRTT | 30 |
| EVDO Rev0 | 40 |
| EVDO RevA | 50 |

| CDMA RSSI | Score |
|---|---|
| <=-125 | 5 |
| -124 to -108 | 10 |
| -107 to -99 | 15 |
| -98 to -89 | 20 |
| -88 to -77 | 25 |
| >=-76 | 30 |

| Uplink | Score |
|---|---|
| CDMA | 30 |
| GSM | 30 |
| Wan0 | 50 |
| WiFi | 40 |
| BB | 35 |
| Android0 | 35 |
| Android1 | 35 |
| VW4GLTE | 100 |

[Commit] [Save] [Cancel]

MOBILE, SECURE AND CUSTOMIZABLE EMERGENCY SERVICE GATEWAY SYSTEM

CROSS REFERENCE TO RELATED APPLICATIONS

I hereby claim benefit under Title 35, United States Code, Section 119(e) of U.S. provisional patent application Ser. No. 61/454,120 filed Mar. 18, 2011. The 61/454,120 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to emergency communication systems and more specifically it relates to a mobile, secure and customizable emergency communication gateway system for providing effective and secure communications for emergency personnel in a mobile environment.

2. Description of the Related Art

Any discussion of the related art throughout the specification should in no way be considered as an admission that such related art is widely known or forms part of common general knowledge in the field.

Emergency situations (e.g. natural disasters, terrorist attacks, law enforcement matters, combat situations, etc.) often times require emergency personnel (e.g. police, firemen, military, etc.) to quickly intervene in a remote geographical location. Remote telecommunication networks (e.g. voice, fax, data, Internet, etc.) for the emergency personnel is vital to ensure a proper response to the emergency. It is important that emergency personnel have an electronic data communication system that is secure to ensure the privacy of the electronic data transmitted. It is also important that emergency personnel have an electronic data communication system that allows for mobility of the emergency personnel providing an "always on" communication system. It is also important that emergency personnel be able to customize the electronic data communication system to adjust to specific environments and situations the emergency personnel anticipate encountering.

Emergency personnel typically utilize a single telecommunication network (e.g. cellular phone, satellite, etc.). However, if the telecommunication network they are using is not available (e.g. cellular network down) or encounters problems (e.g. low bandwidth), the emergency personnel are not able to effectively communicate from the remote location which can hinder the emergency response.

Because of the inherent problems with the related art, there is a need for a new and improved mobile, secure and customizable emergency communication gateway system for providing effective communications for emergency personnel in a mobile environment.

BRIEF SUMMARY OF THE INVENTION

The invention generally relates to an emergency communication gateway system which includes a mobile communication unit, a plurality of remote devices in communication with the mobile communication unit, one or more central communication units, and a plurality of telecommunication networks. The mobile communication unit creates a plurality of virtual private networks (VPN) over the telecommunication networks tunneled to the central communication unit. The plurality of VPNs ensure that at least one VPN is available at all times for the mobile communication unit to communicate with the central communication unit.

An object of the present invention is to provide a method and system for platform supporting voice, video, data and sensor data with IP security and mobility.

Another object of the present invention is to leverage a common infrastructure for enabling IP security, IP mobility and for enabling automation controller for the connected sensors and devices.

Another object of the present invention is to enable and maintain IP mobility over one or more secured uplinks to provide seamless IP connectivity for the connected devices, sensors and users.

Another object of the present invention is to enable and maintain IP mobility among the available uplinks based on the parameters such as but not limited to IP uplink-quality, signal quality, and user-defined priority.

Another object of the present invention that enables standards based IP security using IPSEC or SSL VPN tunnels that are simultaneously enabled over the multiple available uplinks.

Another object of the present invention is to enable and maintain a multi-layered hierarchical integration method for building customized automation controllers for the connected sensors, devices, applications etc.

Another object of the present invention is to provide a system that can be configured to simultaneously connect to a global computer network (e.g. Internet) using one or more IP uplinks to convert off-the-shelf platforms such as smart-phones, single-board-computers into an intelligent IP gateway platform for M2M (machine to Machine) applications, remote access, automation controller for sensor integration and a wide range of customized applications.

Another object of the present invention is to provide a system that allows for adding multiple IP uplinks using 3G/4G data-cards, wireless and wired interface. The configuration set by the user defines the priority and preferences for the added or available uplinks. The uplink includes data-cards, modems, tethered devices, Ethernet, wired or wireless interfaces and related communication devices.

Another object of the present invention is to provide a system that when enabling mobility across multiple wide area network (WAN) uplinks, IP security is enabled using standards based encryption.

Another object of the present invention is to provide a system ensures that switching between the uplinks is seamless and is not impacted by the crypto key exchange or VPN tunnel setup procedures.

Another object of the present invention is to provide a system that is designed to account for parameters such as WAN uplink technology, signal strength, user-defined preferences, historical data, GPS location and the like.

Another object of the present invention is to provide a system that, while using multiple wide area network (WAN) uplinks, allows modular addition of devices, sensors, actuators, modems and the like into the overall system. The information from these devices can be used to influence the policy that governs the selection of uplink for IP mobility. Automation controllers can also use this information for post-processing of data and derive information.

Another object of the present invention is to provide a system that allows fetching information from the remote systems such as servers in the "cloud" or secure intranet based applications using software plugins, software programming interfaces and the like.

Another object of the present invention is to provide a system that allows a user to manually choose a preferred IP uplink and override the decisions taken by the system using the automated IP mobility and security modules.

Another object of the present invention is to provide a system that can leverage any standards based virtual private network (VPN) technology for IP Security (such as SSL VPN or IPSec).

Another object of the present invention is to provide a system that can leverage the hardware and software based encryption capabilities using multiple different crypto implementations.

Another object of the present invention is to provide a system that provides a unified method and system for creating a modular gateway involving sensors, applications, mobility and security all using a common and modular infrastructure.

Another object of the present invention is to provide a system that can be implemented on a wide range of platforms including but not limited to INTEL®, ARM®, or compatible with the same.

Another object of the present invention is to provide a system that can leverage several different operating systems such as variations of LINUX®, WINDOWS® and the like.

Another object of the present invention is to provide system can be used to build industry or market a vertical specific solution such as but not limited to telemedicine, oil and gas remote site monitoring, home monitoring and controls, telehealth, telepathology, and industrial automation.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a block diagram illustrating the overall communications of the present invention.

FIG. 2C is an exemplary interface for the present invention illustrating sample values for the network score to be calculated.

DETAILED DESCRIPTION OF THE INVENTION

Figure 2A:
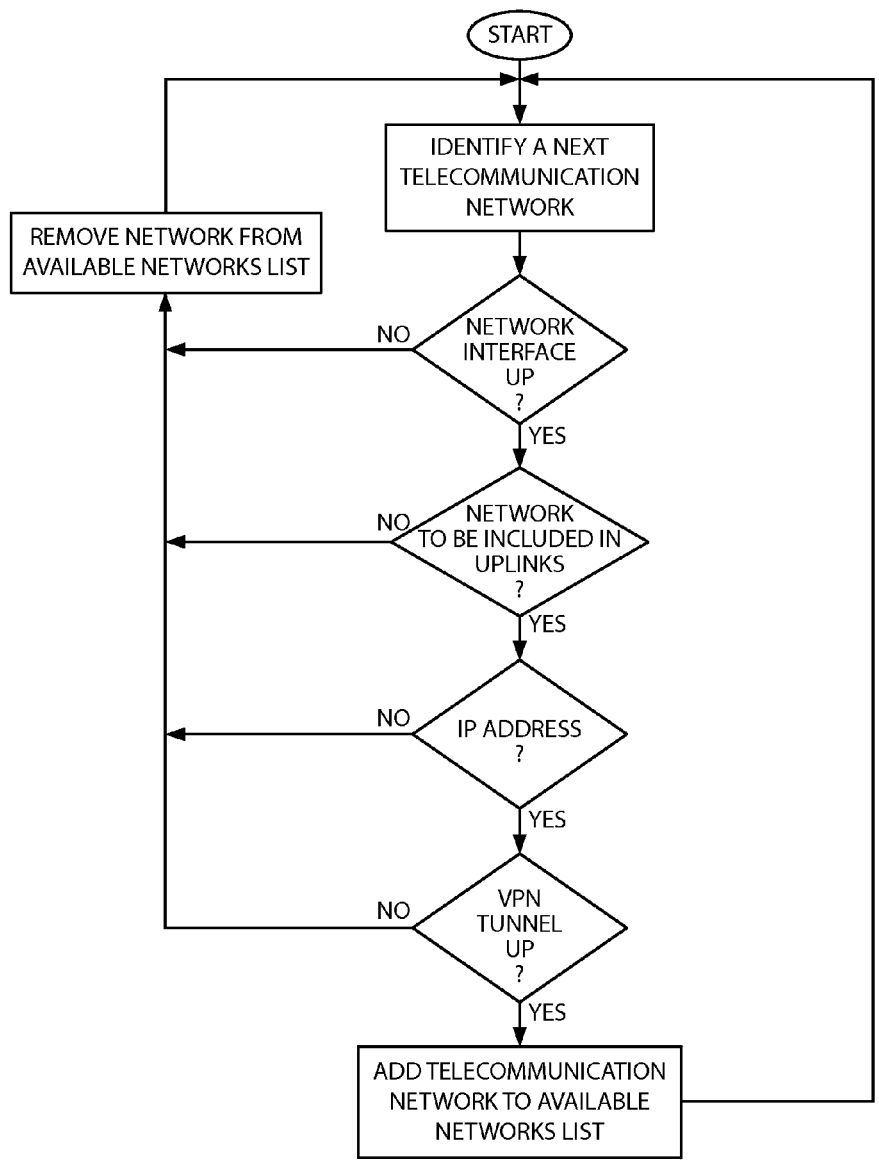
FIG. 2A is a flowchart illustrating the identification of available networks for the mobile communication unit to potentially communicate via.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

A. Overview of Invention.

FIGS. 1 through 15 illustrate the present invention. The mobile, secure and customizable emergency communication gateway system generally includes a mobile communication unit 20, a plurality of remote devices in communication with the mobile communication unit 20, one or more central communication units 30, and a plurality of telecommunication networks. The mobile communication unit 20 creates a plurality of virtual private networks (VPN) over the telecommunication networks tunneled to the central communication unit 30. The plurality of VPNs ensure that at least one VPN is available at all times for the mobile communication unit 20 to communicate with the central communication unit 30. Load balancing of communications may also be achieved over the plurality of VPNs.

B. Exemplary Telecommunications Networks.

The present invention may be utilized upon any telecommunication network capable of transmitting data including voice data and other types of electronic data. Examples of suitable telecommunication networks for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

The Internet is an exemplary communications network for the present invention. The Internet is basically comprised of a "global computer network." A plurality of computer systems around the world are in communication with one another via this global computer network and are able to transmit various types of data between one another. The communications between the computer systems may be accomplished via various methods such as but not limited to wireless, Ethernet, cable, direct connection, telephone lines, and satellite.

The present invention may communicates via a single telecommunication network or multiple telecommunication networks 10, 11, 12, 13. As illustrated in FIG. 1 of the drawings, it is preferably that a plurality of communication channels are created between the mobile communication unit 20 and the central communication unit 30 are preferably established to allow for load balancing, bundling and link bonding, utilizing the best telecommunication network for communications and to provide backup communications in the event of a failure within one or more of the telecommunication networks. While FIG. 1 only shows four telecommunication networks 10, 11, 12, 13, more or less telecommunication networks may be utilized with respect to the present invention.

It is also preferable that each of the multiple telecommunication networks 10, 11, 12, 13 be comprised of a different type of telecommunication network (e.g. global computer network, cellular network, satellite communications network, microwave communications network, etc.). For example, the first telecommunication network 10 could be broadband Internet access via a cable television infrastructure, the second telecommunication network 11 could be wireless Internet access, the third telecommunication network 12 could be satellite communication network access, and the fourth telecommunication network 13 could be a cellular network such as third generation mobile telecommunications (3G) or fourth generation mobile telecommunications (4G). Any number of communication channels via the telecommunication networks 10, 11, 12, 13 may be established between the mobile communication unit 20 and the central communication unit 30.

While it is preferable to utilize different telecommunication networks for each of the communication channels to provide flexibility within the present invention, multiple communication channels may be established via the same type of telecommunication network when beneficial for telecommunications (e.g. utilizing 2 or more cellular modems to communicate via the same cellular network that has a high quality signal and bandwidth in a certain geographical area).

C. Central Communication Unit.

The central communication unit 30 may be comprised of any central communication site where communications are preferably established with. The central communication units 30 may be comprised of a server computer, cloud based computer, virtual computer, home computer or other computer system capable of receiving and transmitting data via IP networks and the telecommunication networks 10, 11, 12, 13. As can be appreciated, a modem or other communication device may be required between each of the central communication units 30 and the corresponding telecommunication networks 10, 11, 12, 13.

The central communication unit 30 may be comprised of any electronic system capable of receiving and transmitting information (e.g. voice data, computer data, etc.). As an example, the central communication unit 30 may be part of an emergency response system including an emergency voice communication system and an emergency data communication system which allows emergency personnel in the field to communicate with individuals in a central office or other locations.

More than one central communication unit 30 may be utilized to provide reduced round-trip delays and latencies. For example, a user on the East Coast of the United States can use a central communication unit 30 located on the East Coast and a second user on the West Coast of the United States can use a central communication unit 30 located on the West Coast. The servers can be placed in the data-centers and can also support failover in case the primary server is not available. The selection of the desired central communication unit 30 can be done using manual preferences, automated sensor based responses and the like.

D. Mobile Communication Unit.

i. Overview of Mobile Communication Unit.

The mobile communication unit 20 may be comprised of any type of computer for practicing the various aspects of the present invention. For example, the mobile communication unit 20 can be a personal computer (e.g. APPLE® based computer, an IBM based computer, or compatible thereof) or tablet computer (e.g. IPAD®). The mobile communication unit 20 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

Figure 3:
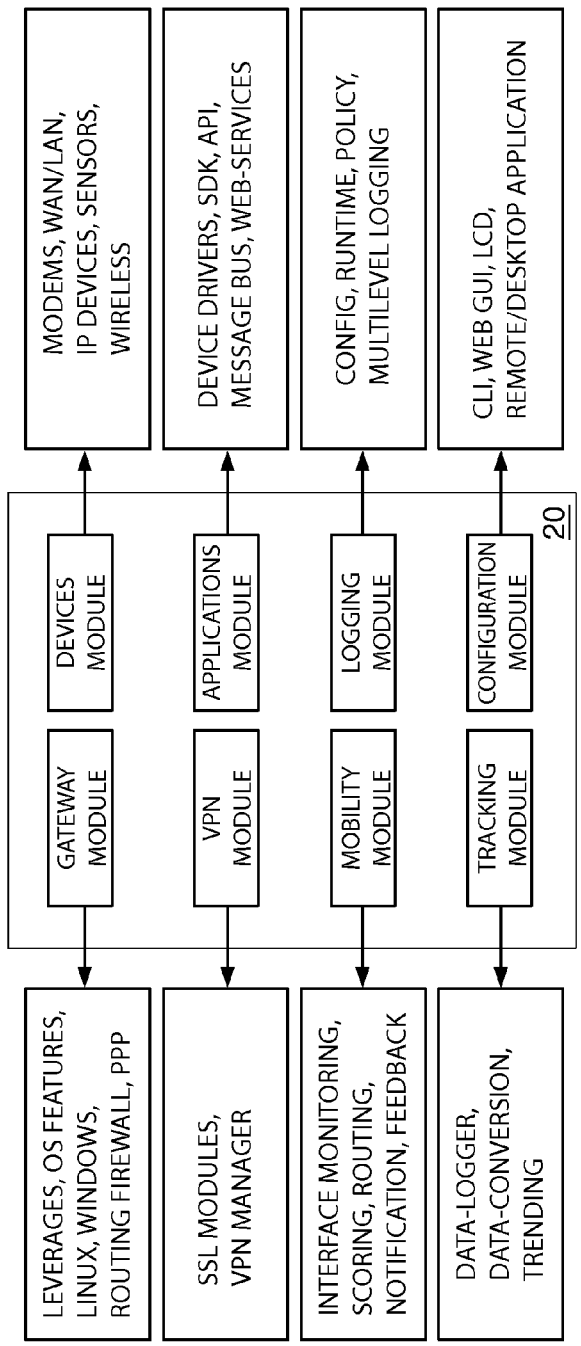
FIG. 3 is a block diagram illustrating the mobile communication unit and the various connections available.

The figures illustrate a common framework to enable an IP gateway, data-logger, sensor aggregation and application integration based on user defined policy. As illustrated in FIG. 3 of the drawings, the main elements of this common framework are the gateway module, VPN module, mobility module, tracking module, devices module, applications module, logging module and configuration module. The modules can be implemented on any type of computer system such as but not limited to a single-board computer (SBC), smartphones and general purpose computing platforms.

As illustrated in FIGS. 4 through 7, some of the functions of the mobile communication unit 20 are separated into the following three hierarchical layers for clarity: Qualification Layer, Policy Conditioning Layer, and Policy Action Layer. The sub-elements that are identified inside qualification layer typically are responsible to prepare the mobile communication unit 20 for handing the policy based automation. The policy consists of "conditions" and respective "actions". The sub-elements that deal with "conditions" are identified under Conditioning Layer and the sub-elements that deal with "actions" are identified under Action Layer. The different main elements of the system can interact with each other through the sub-elements for gathering information for qualification, conditioning or action related aspects.

ii. Exemplary Computer System for Mobile Communication Unit.

A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

The present invention can also be embodied as computer readable code on a computer readable medium. The computer readable medium is any data storage device that can store data which can be thereafter be read by a computer system. Examples of the computer readable medium include but are not limited to read-only memory, random-access memory, magnetic data storage devices such as diskettes, USB flash drives, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to ANDROID, UNIX, MACINTOSH, LINUX, WINDOWS, PALMOS, EPOC, WINDOWS CE, FLEXOS, OS/9, and JAVAOS.

iii. Gateway Module.

The gateway module is one of the conventional main elements that leverages operating systems (OS) for enabling the common gateway functions (e.g. software and/or hardware gateway functions). The common gateway functions include IPv4/IPv6 stack, SSL, Router, PPP, SSH, DHCP, Web-Browser, WebServer, SNMP, NFS, SFTP, QOS FileSystem, USB, Ethernet, 802.11, UART and the like. This layer is integrated into the common policy-based integration and automation framework using the sub-elements that enable hierarchy.

As shown in FIG. 3 of the drawings, the gateway module provides one of the basic building blocks for mobile communication network including the operating system, IP networking and routing functions, firewalls and application packages. The IP networking gateway function enabled by the gateway module preferably has local area network (LAN) and Wide Area Network (WAN) sides. The packages that come with the gateway module provide includes IPv4/IPv6 stack, SSL, Router, PPP, SSH, DHCP, web browser, web server, SNMP, NFS, SFTP, QOS, FileSystem and the like. The gateway module also preferably leverages the operating system features to enable application layer gateway (ALG) such as firewall and network address translation (NAT) and the like.

The software infrastructure provided by the operating system provides the software modules that serve as the foundation for enabling the common policy-based integration and automation framework. The gateway module may utilize various operating systems such as but not limited to LINUX®, WINDOWS®, ANDROID® and other proprietary or open source software implementations.

The hardware infrastructure enabled by the gateway module includes the interfaces such as USB, serial, Ethernet, wireless and the like. Additional hardware interfaces and modules can be added based on the customization requirements.

One variation of the gateway module is using a conventional computer system with one or more uplinks, the WAN side (e.g. Ethernet, Wi-Fi, 3G/4G modems, a tethered smartphone, etc.). On the LAN side of the gateway module, the devices 15, 16, 17, 18, 19 such as computers, cameras, microphones, GPS antennas, surveillance systems, alarm systems, energy management systems, biometrics devices, actuators, mobile phones, smartphones, or sensors can be attached via Ethernet, Wi-Fi, serial, USB, short-wavelength radio transmissions to create personal area networks (e.g. BLUETOOTH®) or any other possible interfaces.

Another variation of the gateway module is using a smartphone with one or more WAN uplinks (e.g. Wi-Fi, 3G/4G, LTE etc.). Devices 15, 16, 17, 18, 19 such as sensors, GPS antennas, accelerometers, cameras and the like are leveraged and additional sensors, devices and USB enabled devices, Ethernet interfaces and sensors are attached to the smartphone via the USB interface. The Ethernet on the LAN side provides IP connectivity to the devices that are attached on the local area networks.

Another simple variation of the gateway module is using a smartphone or computer with one or more WAN uplinks (like Wi-Fi, 3G/4G etc.). The sensors or a sensor gateway (that aggregate multiple sensors and devices) are preferably attached using wireless to the system via BLUETOOTH®. This option does not require IP address based connectivity between the sensor and the IP gateway. In this mode the sensor data-transfer occurs over BLUETOOTH®. The other main-modules on the smartphones or computers process the sensor information.

Other variations can be leveraging the smartphone or a single board computers to build an IP router with firewall, NAT and the like to enable the router functionality between the LAN and WAN. Additional sensor data processing modules may be added based on the sensor and device integration requirements.

iv. VPN Module.

Figure 4:
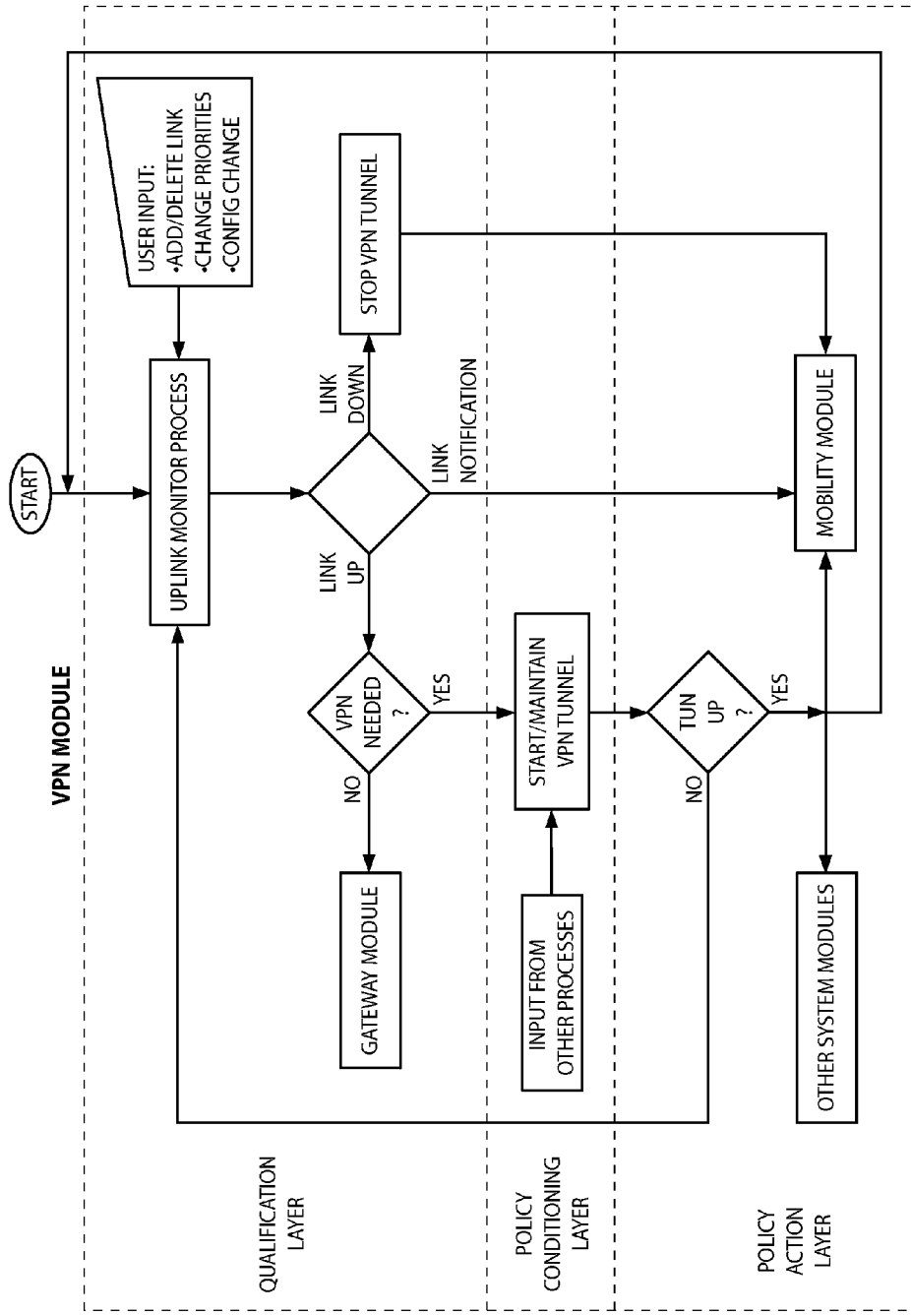
FIG. 4 is a flowchart illustrating the overall function of the VPN module of the present invention.

FIG. 4 illustrates the overall functionality of the VPN module. The VPN module leverages the standards based virtual private network (VPN) applications and modules. The main function of this module is to setup and tear down the secure connectivity to one or more central communication units 30. The VPN module also provides seamless failover capability for the secure VPNs. The VPN module allows the remote gateway to setup and maintain a secure uplink over public networks such as the Internet. Multiple simultaneous VPN tunnels are preferably enabled and maintained over the Internet Protocol (IP) connectivity enabled by cellular, wireless, Ethernet and other IP enabled interfaces by the gateway module. The VPN module also maintains secure mobility over multiple secure uplinks using the mobility module.

Multiple standards based and open source VPN implementations can be leveraged by the VPN module to setup the secure VPN tunnels. These implementations support IP Security (IPsec) VPNs (Triple Data Encryption Standard [3DES] or Advanced Encryption Standard [AES]), Secure Sockets Layer [SSL] VPN. One or more central communication units 30 can be used by the VPN modules to ensure fallback or failover in the event of failure. The VPN manager sub-module manages setup and tear down and maintenance of the VPN tunnel on every available WAN uplink. These tunnels are utilized by the system for routing packets. Other modules such as mobility modules influence the routing decisions. Multiple simultaneous VPN tunnels are enabled and maintained over the Internet Protocol (IP) connectivity established over cellular, wireless, Ethernet and other IP enabled interfaces. The user defined preferences and uplink availability influences the automated routing configuration that results in selection of secured VPN tunnel, that is preferred for sending data over the secure IP uplink.

The VPN module can leverage proven IPSEC and SSL VPN implementations including open source implementations such as STRONGSWAN, or OPENVPN, CYASSL, YASSL or other commercially licensed implementations. The VPN manager that manages the bring-up and tear-down of the VPN tunnels is shown in FIG. 4.

Any VPN software can be used to connect a remote system to a central communication unit 30 (intranet). The VPN implementation can be configured by the system to failover to the available VPN aggregation if the primary central communication unit 30 fails or is unreachable.

This design supports different VPN implementations-types can be mixed and used simultaneously, by this system, for securing the different uplinks. For example, if there are three WAN uplinks, the system can be setup with a different VPN types (IPSEC or SSL VPN) to secure uplinks.

Based on the user configuration the system can also work as a router, without the secured uplinks, by disabling the VPN module. FIG. 4 shows the details of the VPN module sub-elements. The VPN module is responsible for the security for the present invention. Any standards based and open source VPN implementations can be leveraged by the VPN module to setup the secure tunnels. Based on the link Up or Down notification from the uplink monitor process shown in FIG. 4, the VPN manager manages setup and tear down of the VPN tunnel for the uplink. Each VPN tunnel will use a unique source port when establishing connection to the central communication unit 30. The new connection being created will be tied to the specific uplink. When handling IP packets for individual VPN tunnels, IP routing rules need to be setup by creating specific entries in the OS IP tables. As a tunnel is established or removed, the VPN module broadcasts a corresponding message to the mobility module and other modules.

v. Mobility Module.

Figure 5:
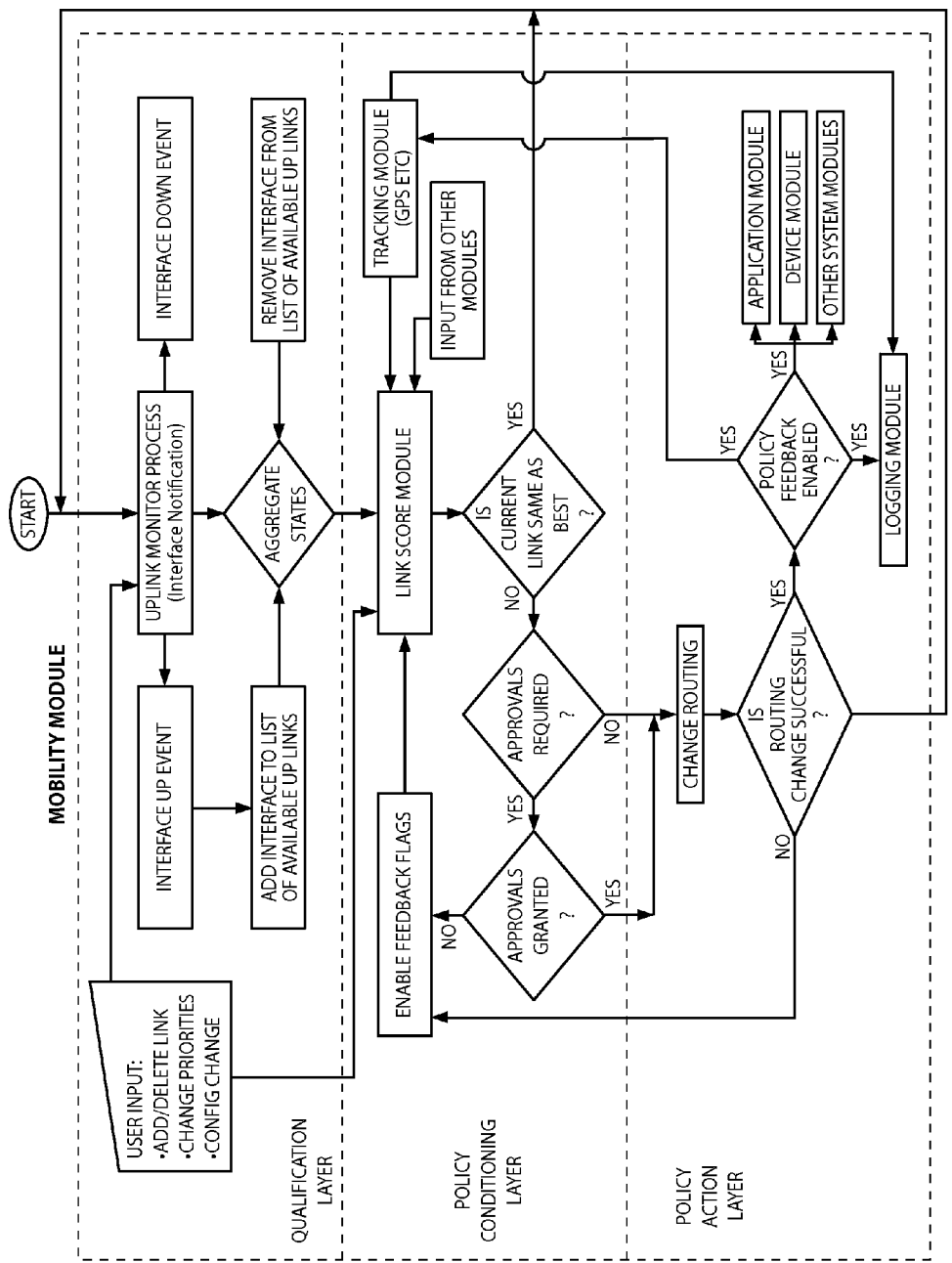
FIG. 5 is a flowchart illustrating the overall function of the mobility module of the present invention.

The mobility module shown in FIGS. 3 and 5 of the drawings enables seamless mobility over the secure IP uplinks. Multiple WAN uplinks can be leveraged by the mobility module to optimize the mobility of the mobile communication unit 20 based on the user defined policy, preference and priority. This module maintains the connectivity for hosts, sensors, applications and other IP devices behind the gateway, when the mobility module switches the IP uplinks.

The mobility module ensures a seamless IP connection to and from the remote system (e.g. the central communication unit 30). The same IP address is preferably maintained at all times regardless of the telecommunication network being communicated over or switched to. The mobility module preferably can operate with or without the VPN module. When enabled to work with the VPN module, the mobility module can switch between the available uplinks secured by the IPSEC or SSL virtual private network (VPN) tunnels. It is preferable that SSL VPN tunnels are created instead of IPSEC VPN tunnels. The active uplink can be switched among the multiple available uplinks based on the user defined configuration. The priority defined by the user along with the real-time link-quality of the wireless or wired uplink constitutes the policy for IP mobility for real-time data transfer (e.g. voice data or video data). The mobility module constantly tracks the feedback regarding the quality and status of the uplinks using feedback module. The weighted scoring module shown in FIG. 2A also tracks the real-time notification regarding the link parameters from the uplink monitor process and accordingly chooses the best uplink for the system. The mobile communication unit 20 can be deployed in a mobile environment and this method allows the system to track the best available uplink and switch the user (and sensor) traffic via that uplink. The seamless switching among the multiple uplinks enables the present invention to maintain the best possible IP connectivity.

The present invention allows the mobile communication unit 20 to switch between the available uplinks based on the link quality and other factors. The superior uplink is automatically selected for use by the mobile communication unit 20 based on the policy set by the user and other factors. It is preferable that the user can specify or change the priority of the available uplinks. This priority consists of parameters such as base score, signal strength and technology used by the uplink. The other influencing parameters include geographic location, bandwidth, cost and the like. In addition, users preferably have the ability to manually override the mobile communication unit 20 to select one or more desired uplinks.

Figure 2B:
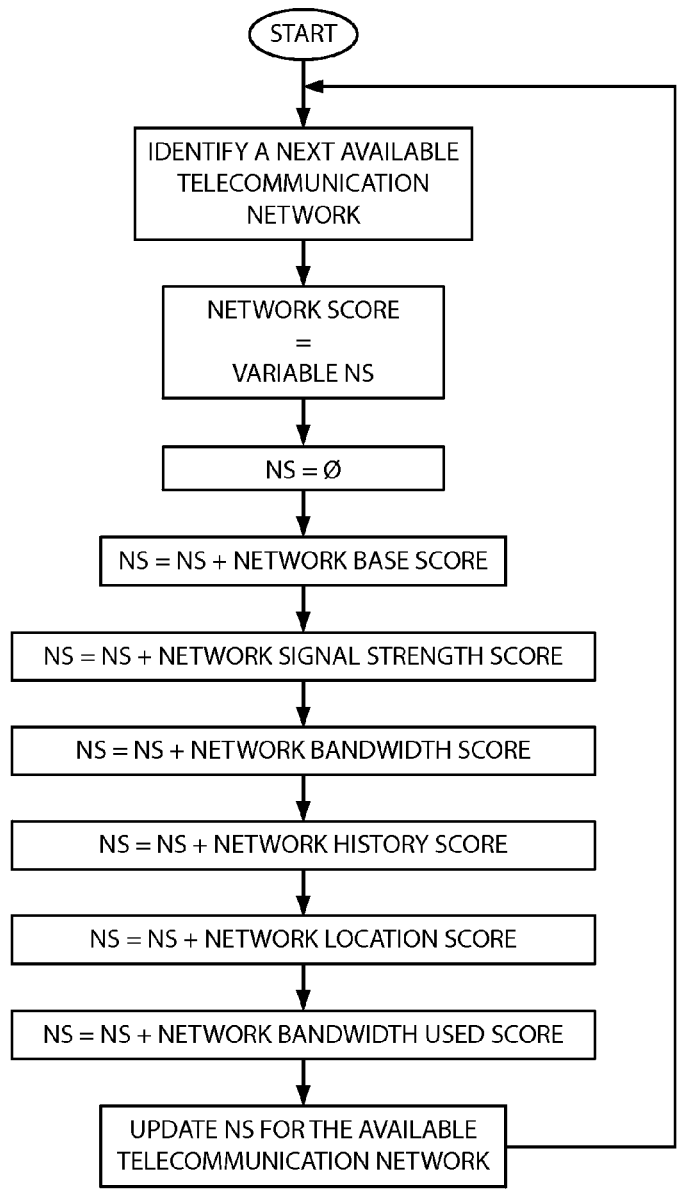
FIG. 2B is a flowchart illustrating the overall calculation of a network score for each of the available networks.

As illustrated in FIG. 2B, the mobile communication unit 20 calculates a weighted score for each available telecommunication network based on the policy set forth by the user to identify the best available uplink to be used. The IP routing changes are done by the routing change to use the best identified link as the current uplink. This method does not use mobile IP protocol.

One variation of the mobility module is implemented with a "Computer System" with one or more uplinks (such as Ethernet, Wi-Fi, 3G/4G Modems, Tethered smartphone). Device (such as computers, sensors) are connected to the LAN side of the gateway via Ethernet, Wi-Fi, serial, USB or BLUETOOTH® interfaces. A VPN tunnel (using VPN module) is established for each available uplink. The preferred uplink is decided based on the best weighted score of the available uplink interfaces.

Another variation of mobility module is implemented with a "smartphone" with one or more uplinks (like built-in, Wi-Fi, 3G/4G capability). Device (such as computers, sensors) can be connected to the LAN side of the gateway via USB or BLUETOOTH® interfaces. A VPN tunnel is established for each available uplink. The preferred uplink is decided based on the best weighted score of the available uplink interfaces.

Another variation of mobility module is implemented with a "smartphone" or a "computer" with one or more uplinks (e.g. built-in, Wi-Fi, 3G/4G, LTE capabilities). Any device (e.g. computers, sensors) can be connected to the LAN side of the gateway via USB or BLUETOOTH® interfaces. A VPN tunnel is established for each available uplink. The preferred uplink is manually decided by the user based on the available uplink interfaces.

Another variation of mobility module may implemented with a smartphone or a computer with one or more uplinks (e.g. built-in, Wi-Fi, 3G/4G, Ethernet or serial capability). An "IP router" is connected to the LAN side (such as on USB or Ethernet etc.). The computers and sensors are connected to the LAN side of the router (that is connected on the LAN side of the system) using any available interfaces. The VPN module is disabled on the system and the preferred uplink is decided based on the weighted score of the available uplink interfaces or by manual selection. The VPN is enabled on the "router" behind the system. In this implementation the mobile communication unit 20 is used to decide the best link among the available telecommunication networks 10, 11, 12, 13 (i.e. uplinks), and enable other IP gateway features such as firewall, NAT, DHCP and the like using the gateway module.

Figure 2D:
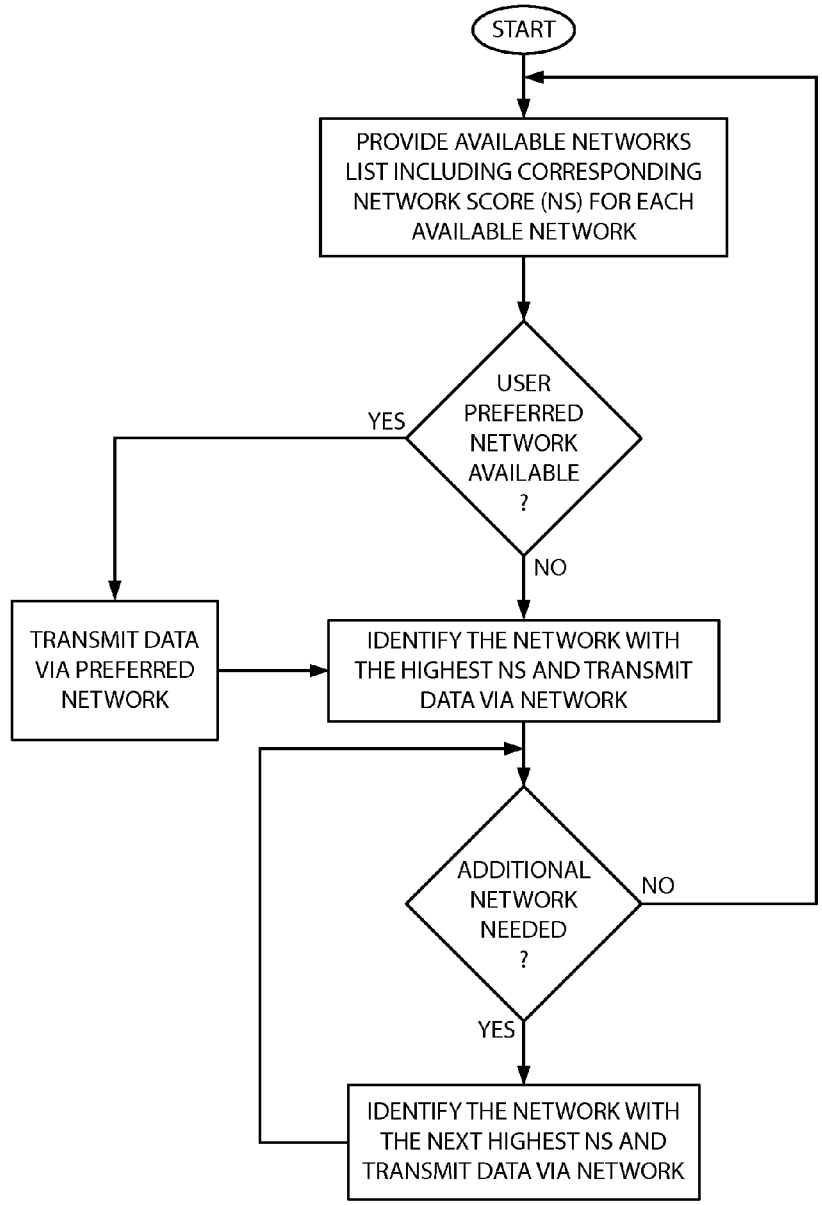
FIG. 2D is flowchart illustrating the selection of one or more networks for the mobile communication unit to communicate via.

FIG. 5 shows the details of mobility module sub-elements and sub-features. The mobility module is responsible for identifying the best available uplink and making routing changes use to the best available uplink. The mobility module gets link notifications (e.g. link up, down, service change) from the uplink monitor process. The mobility module also takes into consideration user specified link related priorities and optional location data from tracking module. Based on the available data, the link score sub-module calculates the weighted "network score" of each available telecommunication networks as shown in FIG. 2B of the drawings. FIG. 2B shows the details and functionality of the link score module. If current uplink in use is the best available telecommunications network, then no action is taken. However, if the current uplink is different from the best uplink, then routing changes are done to switch to the best uplink as illustrated in FIG. 2D of the drawings. If the best identified link requires user's approval, the mobile communication unit 20 prompts the user for approval using various user interfaces. The mobility module then notifies the other modules (user interfaces, logging module, etc.) about the change in the uplink.

The link score module illustrated in FIG. 2B of the drawings calculates weighted "network score" (NS) for each available uplink. During network score calculation, if any condition fails, the network score can be set to '0' to completely eliminate the link form being included in best link identification process as illustrated in FIG. 2A of the drawings. Optionally, the network score can be manipulated (e.g. reduced) for each failing condition to lower the ranking of the telecommunication network within the list of available telecommunication networks.

vi. Devices Module.

Figure 6:
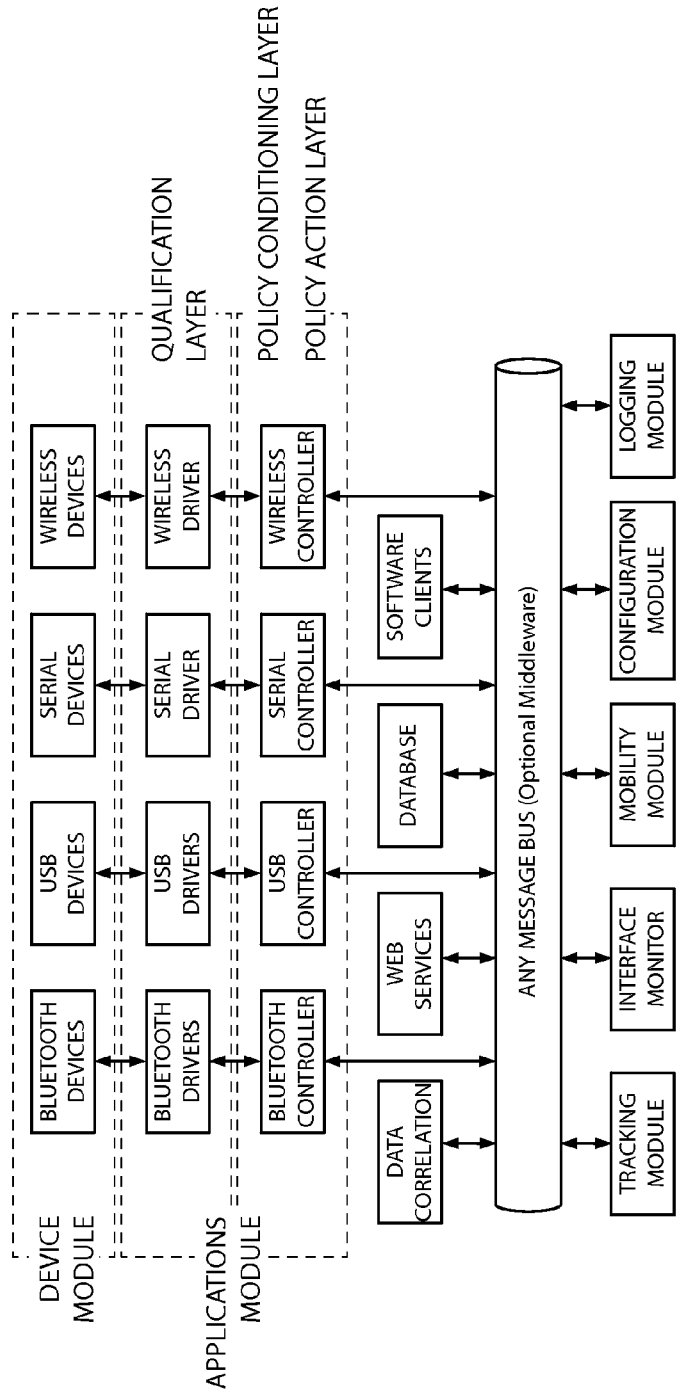
FIG. 6 is a block diagram illustrating the communications between the device module and the application module.

As shown in FIG. 6 of the drawings, the devices module enables the integration of the sensors, actuators and devices that are directly or indirectly attached to the gateway module. The devices can be attached using IP, USB, serial and various other conventional communication links. The devices module includes software components such as device drivers that integrate the devices into the operating system and applications. The device drivers and user configuration can be used for IP uplinks over Ethernet, USB, serial, BLUETOOTH® or Wi-Fi interfaces. The hardware interfaces used to integrate the devices into the gateway are also part of the devices module.

The devices module include devices, such USB modems, wireless devices, IP enabled devices, serial devices, sensors and actuators, analog and digital I/O. The devices module can also include computer systems or smartphones when the peripheral devices connect over IP or USB link on LAN or WAN side of the system. These devices connect to the system over the hardware infrastructure enabled by the gateway module or over the IP network.

One variation of the devices module is USB modems and data cards. The 3G/4G, LTE, Ethernet and Wi-Fi USB modems and data-cards can be used as devices to setup the WAN uplinks. Another variation of devices module is sensors or sensor packs. The system can connect to chemical, biological, medical and environmental sensors over Ethernet, serial, USB and BLUETOOTH® interfaces. The data received by these sensors will be handled by the applications module on the system, that enable drivers as part of the qualification layer and user-defined policy based actions. Based on the system configuration, the mobile communication unit 20 can upload the data to pre-configured web servers (e.g. cloud based archives such as GOOGLE HEALTH, GOOGLE METER, MICROSOFT VAULT or any other proprietary archives) or trigger notifications like an alarm, send an SMS, send an email, making a voice call and the like.

The devices integrated as devices modules can be used for both input or output based on its capabilities and integration with the system. The devices module comprises of all peripherals that can be used with the system. USB modems may constitute the cellular data cards. The system can have one or more of the cellular modems. During system startup or when a modem is plugged-in to a running system, the system initiates a PPP call to establish a data connection for the modem. Once a successful data connection is established, the link qualifies to be included as a valid and available uplink.

A smartphone sub-element can be used in two different ways. In one approach, the smartphone is connected to the system over USB, BLUETOOTH® or Wi-Fi can be tethered and used as an uplink to system. In another approach, smartphone can be used as a configuration module. In this approach, the smartphone can use its web browser to get and set system configurations by connecting to the web server of the mobile communication unit 20 (it can be appreciated that various other computers may be utilized to configure the mobile communication unit 20 directly or remotely). Alternatively, the smartphone can use a resident smartphone application to get and set system configuration over IP link.

The sensors can comprise chemical, medical, biological or environmental sensors connected to the system over serial, USB, wireless or BLUETOOTH® interfaces. The sensors specific APIs running on the system receive the data sent by the device or poll the device for the data. The API take action (e.g. uploading to a web service, setting up alarms, send email/SMS, trigger other peripherals, make VOIP calls) based on the data received. The API can also send the data and action performed information to the logging module for logging purpose.

vii. Applications Module.

The applications module provides the ability to integrate the user space applications of the operating system (OS). As needed, the user space applications also interact with the kernel space drivers that belong to the devices module using application programming interfaces (API) and software interfaces. This components of this module leverage and interact with the data from drivers and middleware. The application modules also exchanges information with the other modules. The applications module is an important component of the common policy-based integration and automation framework.

The applications module consists of device drivers, programming interfaces and vendor provided software development kits, web-services for integration with "cloud" based systems and clients, database, data-correlation modules, software clients and optional middleware software such as message-bus. The system could leverage several available open source middleware message-bus such as DBUS, GMSEC and the like.

The system uses the applications modules to integrate the devices into the common policy-based integration and automation framework as shown in FIG. 3. The applications module also plays a key role in integrating the different sub-elements of applications modules to interact together based on the user defined policy. For example, the cellular 3G/4G data cards and uplink options when using smartphone as a tethered uplink involves control plane and data plane interaction. The software interfaces provide link statistics like signal strength, technology, bandwidth usage and notifications. For data plane the application modules invoke the gateway module provided PPP sub-module to start the data channel for establishing IP connection with the 3G/4G providers. In case the control plane software is not available for the 3G/4G modems the application module can invoke the PPP and AT commands to establish the IP uplink.

The applications module also serves as the middleware for integration and controlling the attached sensors, I/O boards, relays and actuators by leveraging the respective software drivers, APIs and SDK. The applications module also implements device controllers that manage the input and output from and to the attached devices and also interact with the other system main and sub modules. The controllers are also implemented to integrate with remote systems over IP and web-services to integrate with IP network based voice, video, data and sensor applications.

The applications module can be configured as a server waiting for incoming requests over TCP-IP sockets or thru web services. The applications module is leveraged for communicating to the outside servers over specific protocols and application interfaces such as SMTP (email), SMS, TWITTER®, FACEBOOK® and the like. Any software written to interact with the attached devices via the drivers and software interfaces can be a part of the applications module. Inter-module communications leverages the applications module enabled software infrastructure and its sub-modules. The applications module also preferably allows implementing redundant software modules to provide high-availability.

Figure 7:
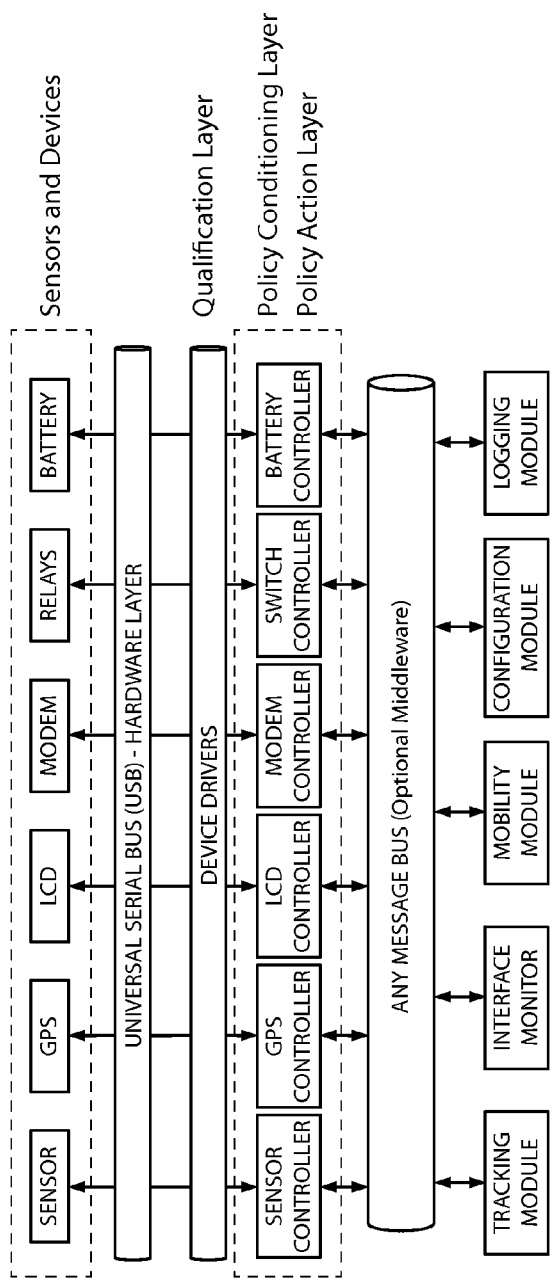
FIG. 7 is a block diagram illustrating the various devices and sensors in communication with the mobile communication unit.

FIGS. 6 and 7 provides the flow chart showing the interaction between the sub-elements of the applications module. The applications module comprises of various user level software applications. Applications interacting with peripheral devices can be built using the SDKs or APIs provided by device manufacturers or using operating system level calls. Applications be built using standard programming languages like C, C++, Java or scripting languages such as perl or shell scripts. These various applications can communicate with each other over a message bus (such as dbus, GMSEC) or an RPC mechanism.

viii. Logging Module.

As shown in FIG. 3 of the drawings, the logging module enables the logging and timestamp for the other modules. The logging module also enables configurable options to enable/disable the scope and details of logging. The logging module can also be leveraged to provide module status to the users via user interface devices. The processed information from the logging module is also used for populating dashboards.

The logging module enabled by the mobile communication unit 20 creates logs with timestamp that can be configured with various levels and details. These logs can consist of, configuration logging that involves date, time and user changing the system configuration, runtime logging involving runtime logging of events such as link(s) going up or down, policy logging such as when routing changes are done by the mobility module involves logging that logs the switching among the uplinks and kit location changes based on the GPS coordinates. The multilevel logging also involves logging sensor data such capture sensor data or policy action taken based on the sensor data can be saved locally on the system or pushed out to centralized logging server or cloud based logging systems simultaneously.

Local logging is enabled on the read-only system. These logs may be lost when the system reboot occurs. Logging may be enabled on the local driver or gateway partition. Logging may be enabled on a remote system also wherein the applications module is leveraged to push the logs to the remote system.

The logging module is responsible for creating and maintaining of logs of various events like link changes, routing modifications, configuration changes, user inputs, sensor and actuator data and tracking data. This module gets notifications from various modules in the system. These notifications can be saved in one or databases or file systems. The logged data can be retrieved later on for analysis and co-relation.

ix. Tracking Module.

As shown in FIG. 3, the tracking module enables the data-logging, data-conversion and trend-tracking for the main elements that require historical data and leverage Heuristic methods for decision making. The tracking module also stores the data locally. The tracking module interacts with the other main elements for providing raw and processed information about the collected data points. The tracking module also uses algorithms and logic to derive the data, convert the data formats as needed by the other main elements.

The tracking module is used by the system to maintain data-logging, data format conversion and tracking trends based on post-processing of data gathered during data-logging. The user configuration and automated triggers influences the tracking module functionality in terms of the system resources usage. The tracking module can be applied to voice, video and sensor information processing and data storage. The tracking modules can leverage open source or commercial implementation for parts of the following modules.

The data logger is initialized and triggered by the other system modules. The data logger maintains the sensor readings with timestamp. The data logger can request the information from a device (e.g. sensor), or the information can be pushed into the data logger. The data logger is also responsible to compress, archive and push the data to the cloud based storage servers. The data logger can limit the number of records that it logs and it can always maintain the latest records and discard or save the old records either locally or on remote servers. The data logger can leverage databases to store the data locally.

Data-conversion is triggered when the system requires translation of data formats. For example, the XML formats may be changed by web-services or for integration with systems that accept a certain data/XML syntax. This module allows the conversion of data formats to either send or receive the data from an external local/remote system. This module can be used to enable interoperability between the systems with different data-formats for publishing or subscribing the information.

Trend-tracking involves post processing of data collected using data logger and data-conversion sub-modules. Algorithms, mathematical formulas or signal processing techniques can be applied to the date to derive the result sets. For example, based on the GPS location combined with the latitude and longitude calculations, the mobile communication unit 20 can intelligently derive its location on earth.

A GPS module can be used to get the location of the mobile communication unit 20 at any given moment in time. Smartphones or modems having GPS capability can also be used to get the geographic location of the mobile communication unit 20. The tracking module periodically logs the records.

A user can set forth a policy based on location. With a change in geographic location, the policy engine will check if there are any configured actions (e.g. use one uplink over the other) related to the current location. If any actions are identified, the policy engine will trigger appropriate action.

The system is used to translate between different data-formats on IP connected local or remote servers or systems. The tracking module can be comprised of a GPS device, GPS enabled modems or GPS enabled smartphone connected to the mobile communication unit 20. The GPS device sends geographical location to the mobile communication unit 20 or the mobile communication unit 20 polls the modem and/or smartphone to get the geographical location. The geographical information available is sent to the logging module, mobility module and any other module looking for the information.

x. Configuration Module.

As illustrated in FIG. 3, the configuration module provides configuration management for the overall system. This module enables local or remote Graphical User Interface (GUI) based configuration options and its respective back-end. The other configuration methods include thin client, thick client, web based configuration, command line interface (CLI), LCD devices for showing and changing configuration, or programmable input from remote systems, via IP networks, digital or analog I/O based triggers and the like.

The configuration module provides multiple interfaces to the users for configuration, control, monitor and track one or more systems. The configuration module coordinates the information from multiple different user interfaces and saves a single copy of configuration. The configuration module moderates between the different user interfaces to ensure that the configuration is in sync for all the user configuration input and output operations. The different user interfaces enabled by configuration modules include desktop interface, web-interface, smartphone interface, command line interface.

The configuration module also maintains the default configuration, and maintains backup of the system configuration. It interacts with application module to monitor the system-configuration reset-conditions to restore the factory defaults and the like. The backup and default configuration can be restored based on the input from the connected devices. Application programming interfaces are also enabled by the configuration module to pragmatically manage the configuration elements over IP network and based on certain monitored events.

The configuration module is also responsible for parsing the user configuration and generate the internal configuration for the different system modules. One variation of configuration module is a desktop application, wherein a desktop based interface is an application installed on and running off a desktop computer or a laptop. This application allows the user to connect to a mobile communication unit 20 from the wired or wireless LAN or WAN. This desktop interface could also connect to the other remote sites connected to the same central communication unit 30. This application gives complete configuration capability to the user. The user can also check system statistics.

Another variation of configuration module is a web Interface. The system can have a web server running on it. This web server provides a web interface to all devices connected on the LAN. These devices may include computer systems, smart phones, netbooks, and the like which have a web browser to view a standard web application.

Another variation of configuration module is a smartphone application. These applications could include IPHONE/IPAD applications or ANDROID applications. These applications could get or set system configurations and statistics by communicating with the host system using TCP-IP connection from the LAN.

Another variation of configuration module is a command line interface (CLI). This CLI communicates to the host system over TCP-IP connection over the LAN. The CLI can be invoked from any computer system, laptop, netbook, smartphone that is connected to the LAN and has a standard SSH, or serial console based configuration capability.

E. Alternative Variations.

The mobile communication unit 20 can be used as an automation controller for just the integration of sensors, actuators, devices and systems. This is useful for M2M applications for remote sites that are used for automated monitoring, triggers, data-logging and sensor management.

The mobile communication unit 20 can be used as an enhanced IP gateway that provides IP security and IP mobility over one or more WAN uplinks. Users may also be able to connect computers, sensors, devices, systems and actuators on the local area network and over the other available interfaces such as serial, USB, BLUETOOTH® and the like.

The mobile communication unit 20 can be used for IP mobility management for both Ipv4 and Ipv6 using a method that does not depend on Mobile IP protocol. The VPN tunnels can be established from another router behind the mobile communication unit 20.

The mobile communication unit 20 can be used to support other similar systems in a mesh networking environment or where multiple systems aggregate together. An example could be that multiple personal area gateways (PAG) converge on a bigger system that provides a higher bandwidth for the overall end-to-end solution.

The mobile communication unit 20 can be used for enabling a secure VPN without using any mobility features. This can function as a gateway that secures the traffic from LAN to connect to their respective intranet. The VPN tunnels (IPSEC or SSL VPN) secures the traffic over the public internet. The WAN interfaces connect to the internet. The mobile communication unit 20 also runs the firewall and router features to enable a robust IP gateway system.

The mobile communication unit 20 can be used just as an IP gateway without using either security or mobility. This can be used to enable a hot-spot from cellular (3G/4G) to Ethernet, Wi-Fi and the like. The mobile communication unit 20 can have other features such as Network Address Translation (NAT), firewall, QOS and other IP gateway features including configuration management. The mobile communication unit 20 can be used to build a custom IP gateway for Communications Security (COMSEC) and additional encryption modules can be added on the LAN to further secure the IP payload.

The mobile communication unit 20 can be used to build to fit in a rugged and portable packaging to provide a mobile and "always best connected" kit for enabling the intranet connectivity for the remote, mobile and tactical missions. The system can be further optimized by either adding acceleration modules (e.g. TCP acceleration) for performance optimization over high-latency networks such as satellite based backhaul connectivity.

Figure 15:
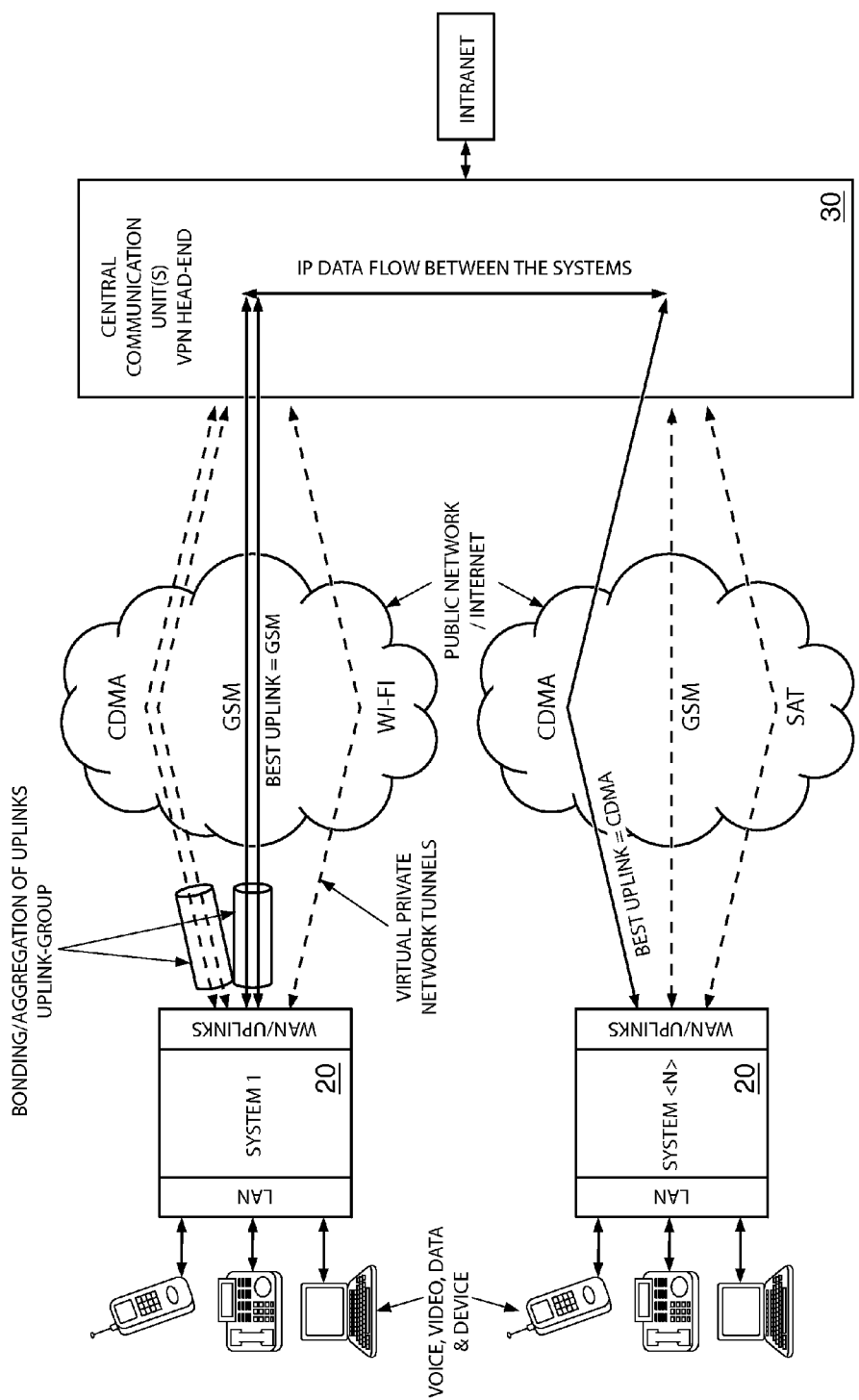
FIG. 15 is a block diagram illustrating the usage of uplink-groups by aggregation of multiple uplinks for the purpose of grouping or bonding of the uplinks.

FIG. 15 illustrates wherein the mobile communication unit 20 provides for "Uplink-groups" by aggregation of multiple uplinks for the purpose of grouping or bonding of the uplinks. This provides better available capacity to the connected LAN, by using the aggregate bandwidth of all the grouped uplinks. As shown in FIG. 15, multiple uplink-groups can be configured by the users based on type of uplinks. For example, multiple 3G uplinks can be grouped as a unique Uplink-Group and similarly multiple 4G/LTE uplinks can be grouped another uplink-group. The mobile communication unit 20 can then be configured to switch between these predefined uplink-groups based on the quality of 3G or 4G uplinks respectively. The secure VPN on the individual uplinks (using SSL or IPSec) can remain independent of the uplink-groups. Each uplink should have a secure SSL or IPSec VPN setup to qualify as a member of the uplink-groups. The system ensures that the uplink-groups are enabled only on the secured uplinks. The hosts on the LAN get improved aggregate bandwidth as a result of aggregating multiple uplinks. Uplink-groups also allow the LAN hosts to consume all the available bandwidth of the uplinks that participate in the respective uplink-group. The system always maintains the ability to switch between a uplink-group (aggregated interfaces) and a standalone uplink interface.

F. Overall Operation of Preferred Embodiment.

i. Initiating Communications.

As illustrated in FIG. 1 of the drawings, communications are initiated between the mobile communication unit 20 and at least a first telecommunication network 10. It is preferable that the mobile communication unit 20 be in communication with more than one telecommunication network. Hence, the mobile communication unit 20 further initiates communications with a second telecommunication network 11, a third telecommunication network 12, and fourth telecommunication network 13 and possibly more telecommunication networks. FIG. 1 illustrates an example of using four telecommunication networks 10, 11, 12, 13 to transfer information (e.g. voice communications, electronic data, etc.) between the mobile communication unit 20 and the central communication unit 30.

ii. Selecting Telecommunication Network(s).

FIG. 2A illustrates identifying which of the telecommunication networks are available for the transfer of information between the mobile communication unit 20 and the central communication unit 30. The mobile communication unit 20 determines if the network interface is up, whether the network should be included in uplinks based on user preferences, whether an IP address has been assigned, and whether a VPN tunnel is "up" through the network. If any of these determinations are negative, the network is removed from the available networks list until it is determined that the network should be added to the list of available networks. This process continues for each of the networks and continues repeatedly to ensure that an up to date status for each of the networks is determined.

After one or more available telecommunication networks have been identified, the mobile communication unit 20 then calculates which of the available telecommunication networks that should be used to communicate through between the mobile communication unit 20 and the central communication unit 30 based on various factors (e.g. network base score, network signal strength, network bandwidth, network history, network location, total network bandwidth used for the month, etc.). A "network score" is provided for each of the available telecommunication networks. If only one telecommunication network is available, that network would have the highest ranking.

If more than one telecommunication network is available, the networks are then ranked based upon their respective network scores (i.e. the higher the network score, the higher the ranking) The mobile communication unit 20 will communicate via the highest ranking telecommunication networks unless they manually override the system to a selected telecommunication network(s) or parameters have been set that automatically override the ranking system. For example, if a sensor in communication with the mobile communication unit 20 detects rain or high humidity, a microwave network or a satellite network may be removed from the list or moved toward the bottom of the list with the communications transferred to a cellular based telecommunications network. As another example, if a sensor in communication with the mobile communication unit 20 detects a low temperature that is below a threshold level, a microwave network or satellite network may be removed and the communications transferred to a cellular network. As another example, if the mobile communication unit 20 is in a geographical location that has a preferred telecommunication network identified by the user such as VERIZON 3G, the preferred telecommunication network will be moved to the top of the list and used for the main communications. In addition, the mobile communication unit 20 may also be preset to only consider telecommunication networks that have a network score exceeding a threshold level (i.e. a minimum network score). FIG. 2C illustrates some sample scores provided for various types of networks and signal strength (e.g. specific telecommunication networks can have a higher base score compared to other networks, etc.).

The mobile communication unit 20 communicates via one or more of the available telecommunication networks 10, 11, 12, 13 based upon the preset configuration. For example, if four networks are available but the user has preset to only communicate via three networks, the mobile communication unit 20 will select the three best telecommunication networks based on the parameters set by the user and the factors present. The LAN devices in communication with the mobile communication unit 20 maintain the same IP address while using or switching traffic between various communication channels and/or VPN tunnels.

iii. Creating VPN Connections.

While a VPN connection is not required for the present invention, it is preferable that at least one VPN connection be created between the mobile communication unit 20 and the central communication unit 30. After one or more telecommunication networks have been identified and selected, the mobile communication unit 20 automatically creates the desired number of VPN connections between the mobile communication unit 20 and the central communication unit 30 as illustrated in FIG. 1 of the drawings. The mobile communication unit 20 may be set to establish a single VPN connection via each of the different telecommunication networks as shown in FIG. 1 of the drawings. The mobile communication may also be set to establish multiple VPN connections via a preferred telecommunication network (e.g. VERIZON 3G/4G/LTE network) as illustrated in FIG. 15 of the drawings. While not required, it is preferable that one or more (or all) of the VPN connections be comprised of secure sockets layer (SSL) VPN connections.

iv. Transmitting Data.

After the communication channels have been established between the mobile communication unit 20 and the central communication unit 30, data is transmitted between the mobile communication unit 20 and the central communication unit 30 via the preferred telecommunication network(s). The mobile communication unit 20 can be preset to attempt to use the best (or the preferred) telecommunication network for all data communications. In addition, the mobile communication unit 20 can be preset to offload a portion of the data communications to a second (or more) telecommunication network during load balancing, with the heavier data traffic preferably going through the first ranked telecommunication network and the remaining data traffic going through the remaining telecommunication network(s). If one of the telecommunication networks become unavailable or incurs a lower network score, the mobile communication unit 20 automatically adjusts the data traffic accordingly to ensure that the data communications from the mobile communication unit 20 and the central communication unit 30 are uninterrupted and continue along the best possible rate.

G. Detailed Operation of Preferred Embodiment.

Before powering on the mobile communication unit 20, the user checks that it is connected with multiple WAN uplink hardware, such as USB based 3G/4G data cards, modems, on-board or USB based Ethernet, Wi-Fi and the like. It is not mandatory to have multiple uplinks via multiple telecommunication networks for the operation, however the IP mobility is only possible when more than one uplink is available. The user ensures that peripheral devices such as uplink devices are connected to the computer or the smart phone that is running the system. The user then powers on the hardware that powers the mobile communication unit 20 and its peripherals. The USB based devices often get the power from the mobile communication unit 20 or an external hub. The operating system comes up before the other main elements. The operating system runs on a CPU and the operating system can be mounted as a read only file-system.

Once the interfaces that constitute the WAN IP uplinks are "UP", the interface monitor sub-element starts monitoring the interface(s) to qualify them to be used by the other main and sub elements of the system. FIG. 4 provides the details of the uplink monitor process and its interaction with the configuration module, VPN module and mobility module as a part of the Qualification Layer. The uplink monitor process takes into account the user configuration and manual input regarding the uplink priority. The state of the uplinks can also be influenced by the manual intervention. For example if the user has decided to administratively shutdown the interface, then that interface will not be qualified by the uplink monitor process (Interface Monitor sub-element) for use by the other main and sub modules of the system. This dynamic intelligence is programmed in this process to track the real-time states of all the connected interfaces.

The uplink monitor process also tracks the information and parameters such as signal strength, uplink technology and related factors. The devices module along with the applications module as shown in FIG. 6 shows the integration of the devices using device drivers, Software Development Kits (SDK) or Application Programming Interfaces (API). These software drivers, SDK or API are built by either leveraging the specifications or software samples provided by the device vendors, or specifically developed for the purpose of integration of devices in the system. The information from the Qualification Layer is passed within the application module to the Policy Conditioning Layer and Policy Action Layer using software controllers. The software controllers process and correlate the information using data-correlation sub-element. The processed information is then forwarded to the interface monitor sub-element and the link score module (network scoring) for use by VPN module and mobility module.

The VPN manager gets uplink status notifications from the uplink monitor process. The VPN manager also creates IP table entries for each uplink. If a link 'up' notification is received, the VPN manager start a VPN tunnel to the central communication unit 30. Each tunnel is established using a unique source port and the same destination port for the central communication unit 30. Once the tunnel is established, the VPN Manager creates IP routing rules for packets originating from each source port. The rule tells the OS to mark each packet appropriately and use the corresponding IP routing table when sending and receiving packets to the central communication unit 30 thru that VPN tunnel. If a link 'down' notification is received from the uplink monitor process, the VPN manager stops the VPN tunnel. When a tunnel is established or destroyed, the VPN manager reports the events to the mobility module and other processes.

The mobility module reads the user specified configuration to identify the priority and preference of each uplink. It waits for link notifications from the uplink monitor process and VPN manager. When any notification arrives, the mobility module calculates the weighted score of each uplink to identify the best available uplink. If the current uplink is the best, the further action is required but if current uplink is not the best, the mobility module updates the default route to use the best link as the uplink. It then notifies the other processes about the change in the uplink. The mobility process also looks for user inputs, if a user forces to switch to one of the available uplinks. In this case, all other uplinks are given a score of zero and routing changes are done to use user specified link as the uplink. mobility module also looks for notifications form the tracking module. If a location change event arrives and it matches user preference for a geographical location, the mobility module modifies the routing to use the best link based on the user's geographical location preference. Every change in uplink is broadcasted to the other modules so that various modules can update accordingly (e.g. user interface updates the uplink, LCD shows which link is in use, logging module logs the switch in the uplink, etc).

The application module covers the overall functionality of the system. The applications module comprises of various standalone modules which interact and control individual functionality and communicate with each other over message bus. The following is a non-exhaustive list of some of the controllers: LCD controller, battery controller, GSM controller, CDMA controller, fan controller, Wi-Fi controller, GPS controller, VPN manager, mobility manager and the like. On boot-up, the system toggles the relay to turn ON the power for USB hub, fan and LCD module. It also starts the various controller software as a service. If a device is available, the controller starts communicating with it, otherwise it waits for the device to be plugged-in or become available.

The battery controller periodically checks the battery status for the mobile communication unit 20. As the battery charge goes low, it notifies the user by glowing the status LEDs and showing the battery capacity left on the LCD.

The LCD controller looks for notifications about the VPN tunnels, Uplinks, GPS locations, battery status and the like from various components and updates the status messages on the LCD. Along with this, buttons on the LCD module are used to take user input. Appropriate action is taken by the LCD controller based on the buttons clicked by the user.

The CDMA/GSM/4G/LTE controllers leverage the SDKs provided by modem manufacturers to control the cellular devices. These controllers get cellular notifications related to signal strength, technology change and notify other modules (e.g. Uplink Monitor Process, LCD Module, etc.). These controllers also start up the the PPP call to establish the data channel over the cellular network.

The GPS controller reads the GPS locations from the GPS device and notifies other modules about the updated geographic location. The Wifi controller keeps track of the Wifi network connectivity. If pre-configured Wifi Network becomes available, it associates with it and notifies the Uplink Monitor Process and other processes. Similarly if a connected network goes down or out of range, the Wifi controller goes back to search mode after notifying the other processes about the link down activity.

The configuration module covers the various user interfaces that allows user to set the system configurations and settings and get system status and notifications. The configuration can have various form factors like a web Interface, computer resident application, smart phone application or a command line interface.

The web interface is a standard web server running on the mobile communication unit 20 communicating with various application modules over the message bus. This module provides a set of web pages to the user to get or set system configurations and a dashboard page which shows quick statistics of the system. A user can access this web page from the LAN side of the local kit or any mobile communication unit 20 using a standard web browser on a laptop, netbook or a smart phone.

The computer application is an application installed on a computer (laptop, netbook, etc.). The computer application connects to the local system or a remote system over message bus using TCP/IP sockets. The computer application provides system setup capabilities and dashboard capabilities to the user.

The smartphone application is a resident application on a smartphone which communicates to the system by making a TCP/IP connection to the system from the LAN side. Similar to the computer application, the smartphone application allows the user to configure the system and get various notifications.

The Command Line Interface (CLI) is a text based configuration which connects to the system over standard SSH/telnet capability. This interface also allows the user to get and set system configurations.

The logging module listens to various events of the systems and logs then in one or more files. The events range from link notifications, VPN up/down events, mobility events (e.g. like change in uplink), location based events (e.g. like change in geographic location), user events (e.g. updating link priorities, choosing an uplink from available uplinks, changing policy actions related to geographic location, etc.).

Figure 13:
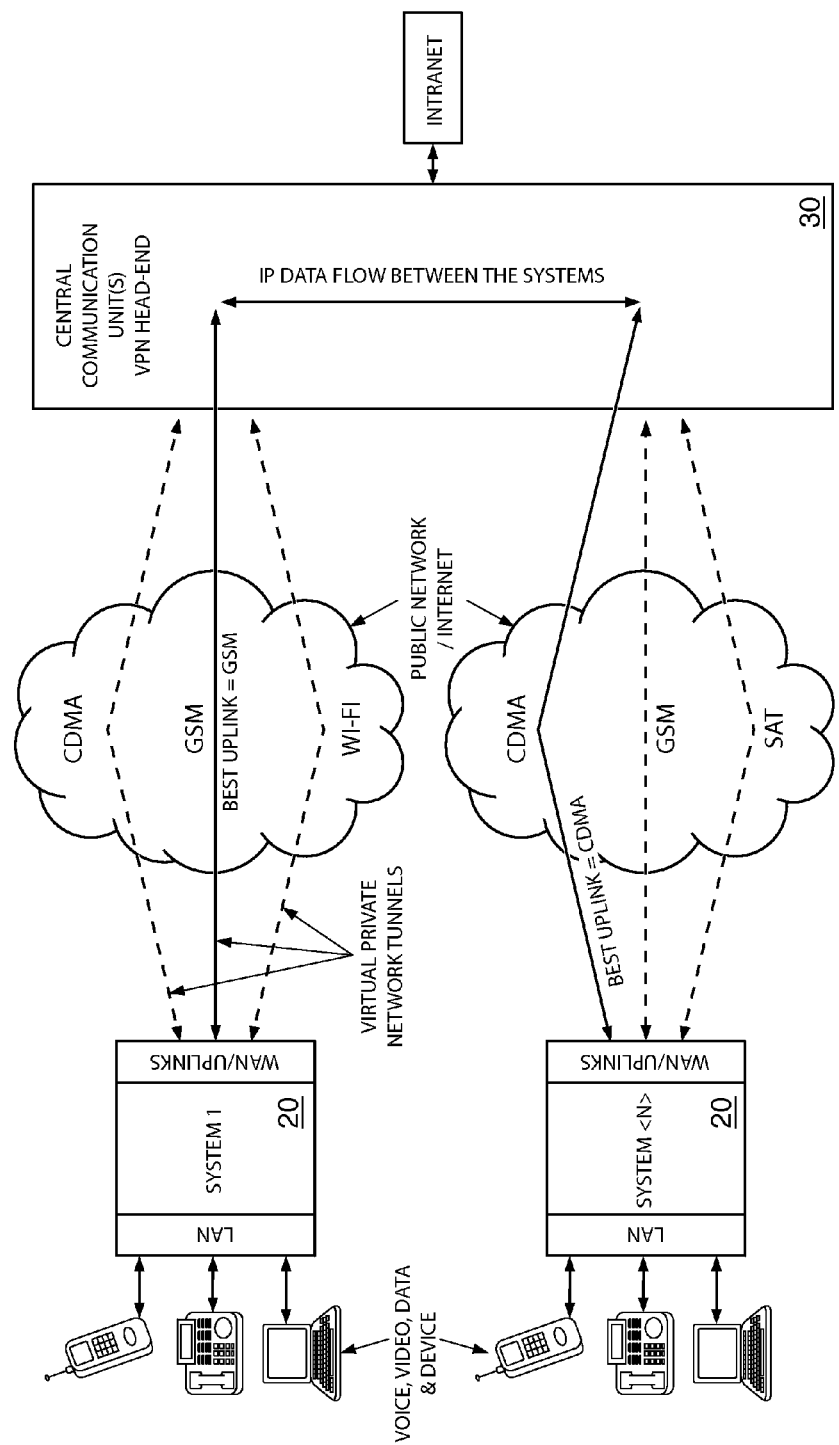
FIG. 13 is a block diagram illustrating the usage of multiple mobile communication units to communicate with a central communication unit, with various communication devices in communication with the mobile communication unit.

The mobile communication unit 20 can be deployed as a tactical communications kit or a mobile kit that provides local hotspot using Wi-Fi access point connected to the system using Ethernet port. The system can also provide Ethernet based local area network (LAN connectivity). The sensors, devices and systems can be connected to the mobile communication unit 20. The Voice over IP and Video Over IP devices can be also attached over IP network. Ethernet or USB based devices can also Video and Audio capability to the system. The Push-To-Talk Radios can also be attached to the remotely deployed system. The System modules enable the Communications capabilities, Security, Mobility and also allow the system to function as an Automation controller for the attached sensors. FIG. 13 shows multiple systems deployed with Voice, Video, Data and Sensor capability. FIG. 13 also shows multiple Wide Area Network (WAN) capability using 3G/4G cellular data-cards that use GSM, CDMA. The other WAN options are Satellite, Wi-Fi (including the public Wi-Fi hotspots). Satellite based uplinks can be connected to the system over Serial or Ethernet.

Most of the WAN uplinks provide dynamic address to the mobile communication unit 20. The CDMA and GSM uplinks use PPP establish IP connectivity. Each of these uplinks are represented as an interface on the Operating System. The interfaces corresponding to these 3G/4G IP uplinks are created on the operating system, when the uplinks connect successfully to the Service Provider using PPP. The Ethernet and Wi-Fi based uplink options use DHCP Client on the Operating System gateway module. The address assigned to the kits on the WAN interfaces can be public address (a unique IP address that can be routed on internet), or private address (an address that are translated to public address by the service provider). The system modules such as VPN module sets up secure IPSec or SSL tunnel based on the security and crypto configuration. The secure tunnels originate at the system and terminate on central communication unit 30 or VPN Aggregator. These tunnels are traverse the internet, and securely carry the IP data from the system to the central communication unit 30 VPN aggregator. The VPN tunnels are setup and maintained by the VPN module. The VPN tunnels terminate on new interfaces on the operating system.

The mobility module enables the mobility among the available uplinks. It has two main functions. It checks the quality of uplinks by tracking multiple parameters (such as signal strength, technology, user defined priority, and stability etc.) and decides the best available uplink. The mobility module manipulates the IP routing using the gateway module and its routing sub-module. The routing table is changed to ensure that the traffic from LAN and locally originated sensor and data traffic chooses the VPN tunnel that corresponds to the best available uplink. The switching between the multiple uplinks is done by dynamically changing the routing. This automated switching does not disrupt the traffic going to the central communication unit 30 and thus maintains seamless mobility across multiple available uplinks.

Figure 14:
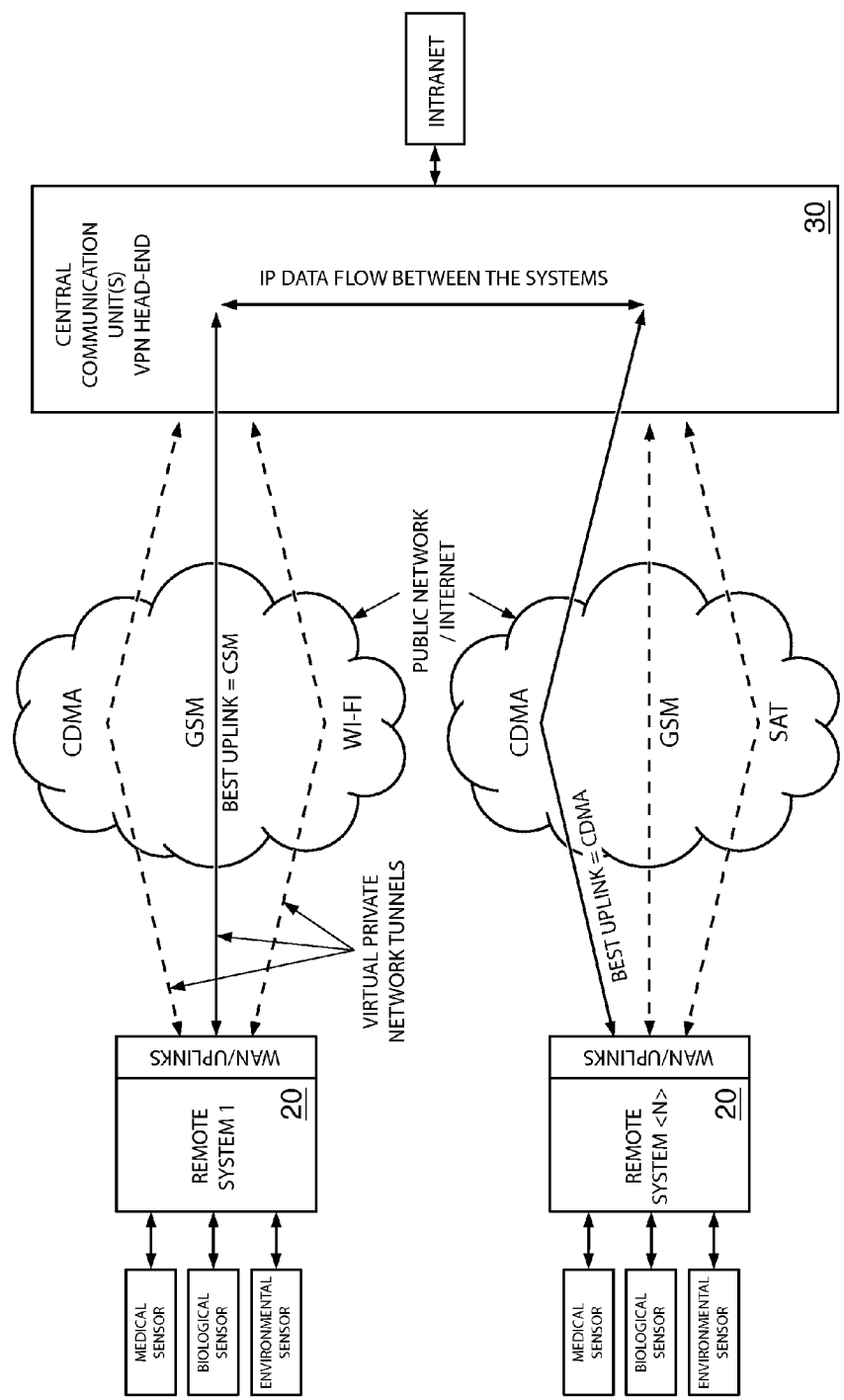
FIG. 14 is a block diagram illustrating the usage of multiple mobile communication units to communicate with a central communication unit, with various sensors in communication with the mobile communication unit.

FIG. 14 shows the system with sensors attached to the mobile communication unit 20. These sensors can be attached over IP network or directly attached to the system using USB, Serial or wireless interfaces. The devices module and applications module enable the automation controllers on the system. These can be used to monitor or control the devices and inter-module communications based on the scenario requirements.

The mobile communication unit 20 unique implementation design and architecture method enables its use as a communications platform and as an automation controller with modularity and flexibility. The mobile communication unit 20 can be used for various applications such as a home-gateway, industrial automation controller, communications security gateway, mobile gateway, sensor aggregator, data logger and many more user defined applications.

FIGS. 13 and 14 also illustrate that connectivity among two remote systems can happen via the central VPN aggregator. This way a large hub-and-spoke configuration enables inter-site connectivity and connectivity from the system to the intranet. The IP network at the central communication unit 30 could also be designed to provide connectivity to internet via secure firewall. The remote systems become the extensions of the intranet over the secure VPN and while being mobile. Additional routers can be added to the LAN side of the mobile communication unit 20 for expanding the system or for enabling secondary security devices.

If the user prefers use the mobile communication unit 20 just as a plain IP gateway without the mobility or security, the mobile communication unit 20 also offers the configuration ability to enable IP gateway mode that only enables simple routing over one of the WAN uplinks. This method is also very useful when setting up public Wi-Fi hotspots WAN uplinks for the system. Typical Wi-Fi hotspots require the users to interact with a flash-page (default page) before opening access to the internet. These flash-page could provide user an option to agree to their terms-and-conditions, or have the user authenticate or pay for the services. Using the IP gateway mode, user can connect to the desired Wi-Fi network. The users from the LAN side can then use any standard web-browser to get to the default flash-page to enable internet access. The IP gateway mode enables IP Network Address Translation (NAT) between the local area network (LAN) and the Wide Area Network (WAN) uplink.

Figure 8:
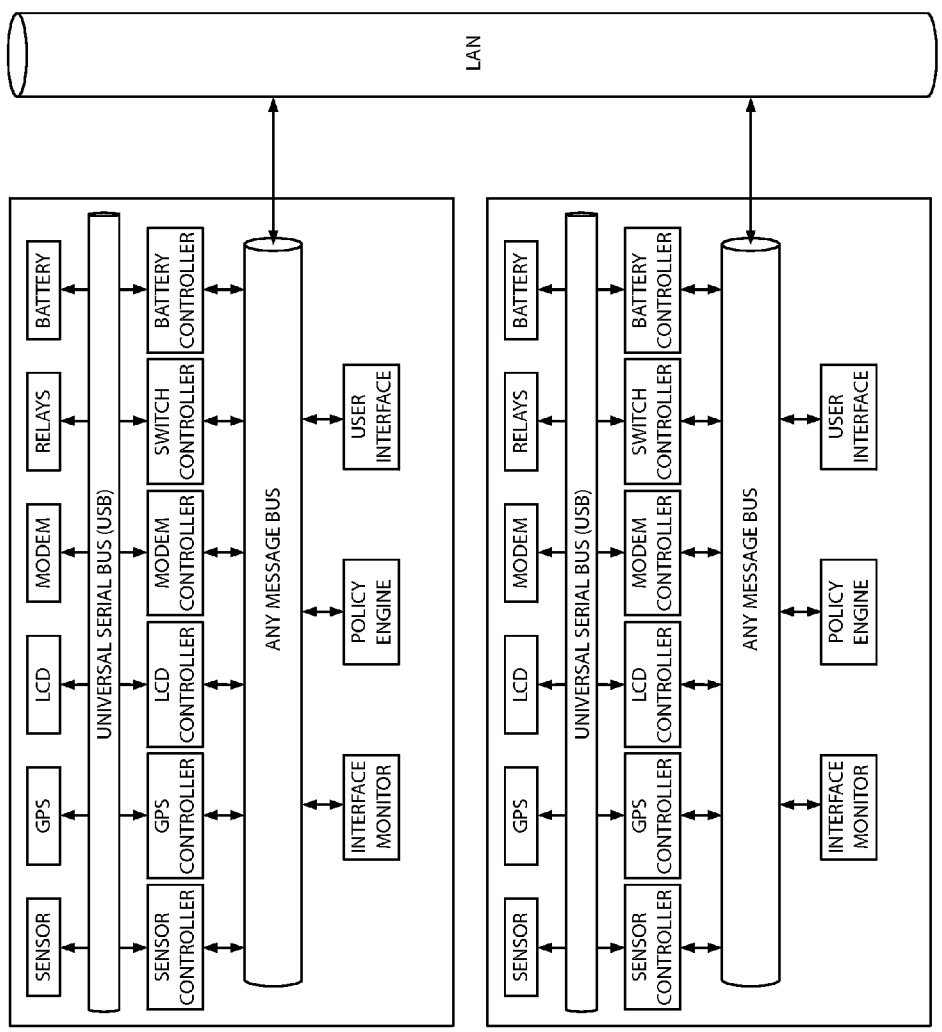
FIG. 8 is a block diagram illustrating the usage of multiple mobile communication units via a local area network (LAN).
Figure 9:
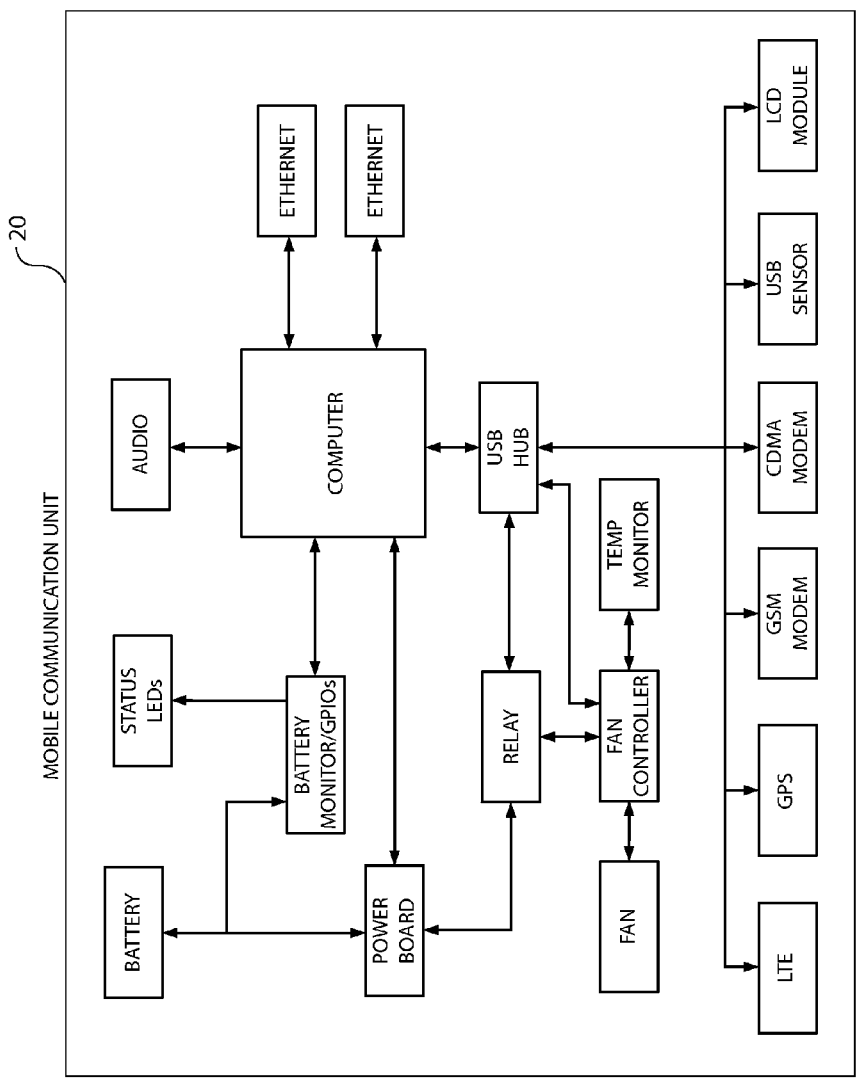
FIG. 9 is a block diagram illustrating the mobile communication unit.
Figure 10:
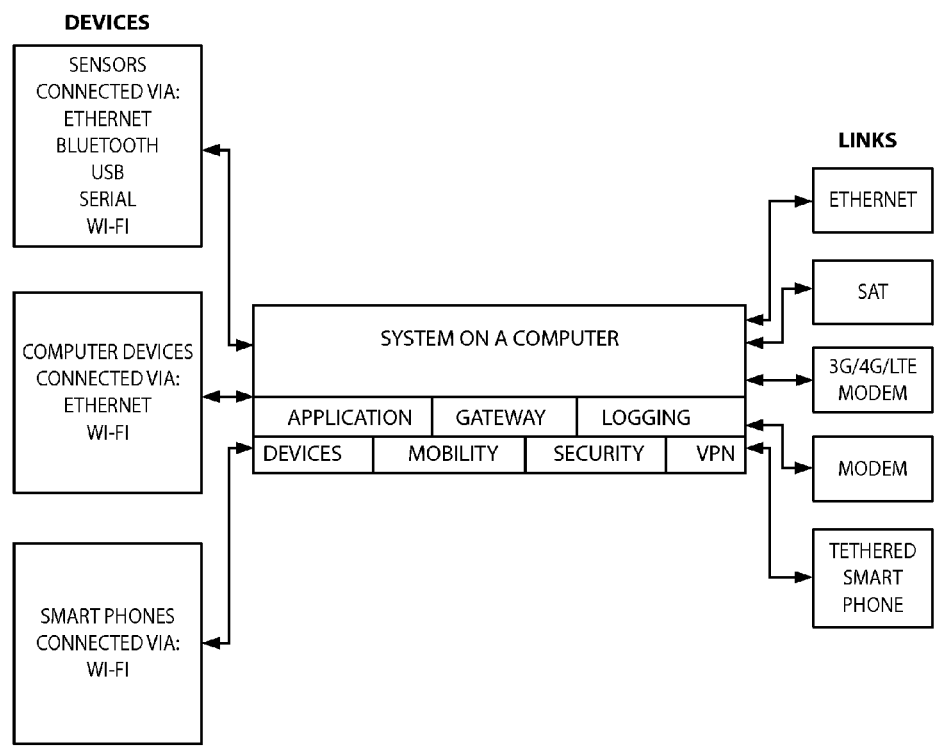
FIG. 10 is a block diagram illustrating the communication of devices and uplinks in communication with the mobile communication unit.
Figure 11:
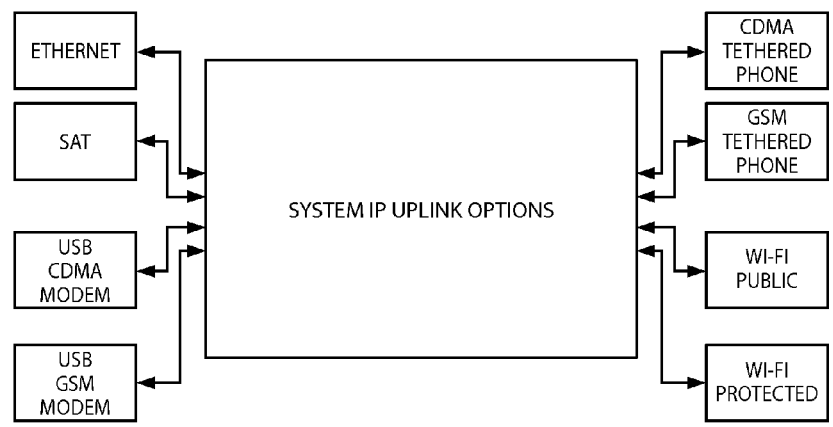
FIG. 11 is a block diagram illustrating the various uplink options available for the mobile communication unit to communicate via.
Figure 12:
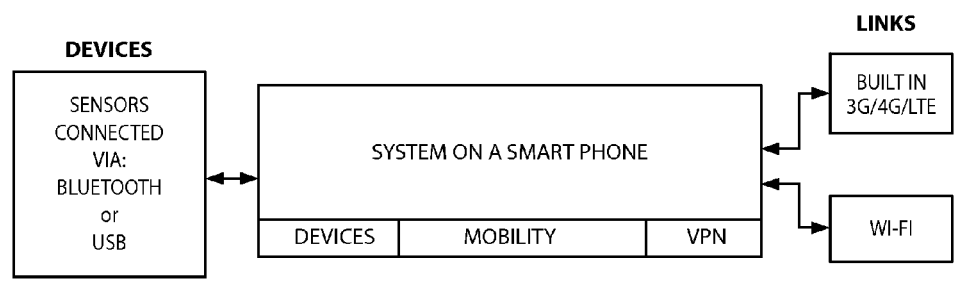
FIG. 12 is a block diagram illustrating the present invention embodiment on a smart phone.

The mobile communication unit 20 can be packaged in a rugged and environmentally resistant case based on the user requirements. Multiple mobile communication units 20 can also be configured to scale up customizing the applications modules to leverage the devices module that are part of the other mobile communication unit 20 reachable remotely or over LAN. FIG. 8 shows an examples of one such system that leverages a middle ware message-bus to communicate among the system. Such methods can be also used to offload some processing to another system and to optimize the resources based on the end-to-end solution requirements.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method for maintaining telecommunications between a mobile communication unit and a central communication unit, comprising:
   initiating communications between said mobile communication unit and a first telecommunication network;
   initiating communications between said mobile communication unit and a second telecommunication network, wherein said second telecommunication network is different than said first telecommunication network;
   creating a first VPN between said mobile communication unit and said central communication unit, wherein said first VPN is created through said first telecommunication network;
   creating a second VPN between said mobile communication unit and said central communication unit, wherein said second VPN is created through said second telecommunication network; and
   monitoring a status of said first VPN and a status of said second VPN; and
   transmitting data from said mobile communication unit to said central communication unit via either said first VPN, said second VPN, or both VPNs.

2. The method according to claim 1, wherein said mobile communication unit is comprised of a mobile phone or a portable computer.

3. The method according to claim 1, wherein said first VPN is comprised of a secure sockets layer VPN.

4. The method according to claim 3, wherein said second VPN is comprised of a secure sockets layer VPN.

5. The method according to claim 1, wherein said first telecommunication network is comprised of one of the group consisting of a global computer network, cellular network, satellite communications network, wireless network or microwave communications network.

6. The method according to claim 5, wherein said second telecommunication network is comprised of one of the group consisting of a global computer network, cellular network, satellite communications network, wireless network or microwave communications network.

7. The method according to claim 1, including at least one device in communication with said mobile communication unit.

8. The method according to claim 7, wherein said at least one device is a sensor.

9. The method according to claim 7, wherein said at least one device is comprised of a computer.

10. The method according to claim 1, wherein said step of transmitting data is comprised of transmitting voice data or video data in real-time.

11. A method for maintaining telecommunications between a mobile communication unit and a central communication unit, comprising: initiating communications between said mobile communication unit and a first telecommunication network, wherein said mobile communication unit is comprised of a mobile phone or a portable computer; initiating communications between said mobile communication unit and a second telecommunication network, wherein said second telecommunication network is different than said first telecommunication network; creating a first VPN between said mobile communication unit and said central communication unit, wherein said first VPN is created through said first telecommunication network and wherein said first VPN is comprised of a secure sockets layer VPN creating a second VPN between said mobile communication unit and said central communication unit, wherein said second VPN is created through said second telecommunication network and wherein said second VPN is comprised of a secure sockets layer VPN; and monitoring a status of said first VPN and a status of said second VPN; and transmitting data from said mobile communication unit to said central communication unit via either said first VPN, said second VPN, or both VPNs.

12. The method according to claim 11, wherein said first telecommunication network is comprised of one of the group consisting of a global computer network, cellular network, satellite communications network, wireless network or microwave communications network.

13. The method according to claim 11, wherein said second telecommunication network is comprised of one of the group consisting of a global computer network, cellular network, satellite communications network, wireless network or microwave communications network.

14. The method according to claim 11, including at least one device in communication with said mobile communication unit.

15. The method according to claim 14, wherein said at least one device is a sensor.

16. The method according to claim 14, wherein said at least one device is comprised of a computer.

17. The method according to claim 11, wherein said step of transmitting data is comprised of transmitting voice data or video data in real-time.

\* \* \* \* \*